(12) United States Patent
Deconde et al.

(10) Patent No.: US 7,638,350 B2
(45) Date of Patent: Dec. 29, 2009

(54) FINGERPRINT SENSORS USING MEMBRANE SWITCH ARRAYS

(75) Inventors: Keith T. Deconde, San Jose, CA (US); Srinivasan K. Ganapathi, Fremont, CA (US); Randolph S. Gluck, San Jose, CA (US); Steve H. Hovey, Goleta, CA (US); Shiva Prakash, Santa Barbara, CA (US); Christopher Stoessel, Bodega Bay, CA (US)

(73) Assignee: SpringWorks LLC, Minnetonka, MN (US)

( * ) Notice: Subject to any disclaimer, the term of this patent is extended or adjusted under 35 U.S.C. 154(b) by 284 days.

(21) Appl. No.: 11/120,525

(22) Filed: May 2, 2005

(65) Prior Publication Data

US 2005/0229380 A1 Oct. 20, 2005

Related U.S. Application Data

(60) Division of application No. 10/038,505, filed on Dec. 20, 2001, now Pat. No. 6,889,565, which is a continuation-in-part of application No. 09/571,765, filed on May 16, 2000, now Pat. No. 6,578,436.

(51) Int. Cl.
*H01L 21/00* (2006.01)
(52) U.S. Cl. .................. 438/53; 257/419; 257/E29.324
(58) Field of Classification Search .................. 438/53; 257/419, E29.324, E29.234
See application file for complete search history.

(56) References Cited

U.S. PATENT DOCUMENTS 4,547,898 A  10/1985  Tsikos ........................... 382/4

(Continued)

FOREIGN PATENT DOCUMENTS

DE  196 487 67  6/1997

(Continued)

OTHER PUBLICATIONS

Harper, Charles A. (Ed.); "Electronic Materials and Processes Handbook"; 2004; The McGraw-Hill Companies, Inc.; Third Edition; Section 7.2 and 7.2.1.2; pp. 7.1 to 7.8.*

(Continued)

*Primary Examiner*—Matthew C Landau
*Assistant Examiner*—Vicki B Booker
(74) *Attorney, Agent, or Firm*—Pillsbury Winthrop Shaw Pittman LLP

(57) ABSTRACT

A method of making an integrated texture sensor for sensing a texture is described. In one embodiment, the method is directed to a sensor that that is protected from external contaminating particulates and will self-equalize using air from outside the sensor. Further combinations of such protection among various membrane switches, in combination with various types of membranes, is described. In another embodiment, a method of making a skin-texture sensor for sensing a skin texture having a plurality of ridges and a plurality of valleys is described, such that when completed, applying a ridge of the texture to a membrane switch will cause flexure of the membrane resulting in a contact between the lower electrode and the upper electrode, the contact establishing an electrical communication between said one of the row lines and said one of the column lines, whereas disposing a valley of the texture over said each membrane switch will not result in the contact between the lower electrode and the upper electrode.

25 Claims, 21 Drawing Sheets

U.S. PATENT DOCUMENTS

| | | | | |
|---|---|---|---|---|
| 4,559,422 A | 12/1985 | Mironenko et al. | ............ | 200/67 |
| 4,570,139 A | 2/1986 | Kroll | ............ | 335/187 |
| 4,577,345 A | 3/1986 | Abramov | ............ | 382/4 |
| 4,582,985 A | 4/1986 | Loftberg | | |
| 4,681,403 A | 7/1987 | Te Velde et al. | ............ | 350/334 |
| 4,684,770 A | 8/1987 | Pitrat et al. | ............ | 200/67 R |
| 4,758,698 A | 7/1988 | Mironenko et al. | ............ | 200/67 DB |
| 4,904,832 A | 2/1990 | Nagahara et al. | ............ | 200/402 |
| 4,965,415 A | 10/1990 | Young et al. | ............ | 200/83 N |
| 5,017,747 A | 5/1991 | Nagahara et al. | ............ | 200/453 |
| 5,113,046 A | 5/1992 | Hauk | ............ | 200/332 |
| 5,121,089 A | 6/1992 | Larson | ............ | 333/107 |
| 5,159,159 A * | 10/1992 | Asher | ............ | 178/18.05 |
| 5,212,473 A | 5/1993 | Louis | ............ | 345/168 |
| 5,262,000 A | 11/1993 | Welbourn et al. | ............ | 156/643 |
| 5,309,006 A | 5/1994 | Willems et al. | ............ | 257/275 |
| 5,354,695 A * | 10/1994 | Leedy | ............ | 438/411 |
| 5,367,136 A | 11/1994 | Buck | ............ | 200/600 |
| 5,374,792 A | 12/1994 | Ghezzo et al. | ............ | 200/16 B |
| 5,400,662 A | 3/1995 | Tamori | ............ | 73/862.046 |
| 5,429,006 A | 7/1995 | Tamori | ............ | 73/862.046 |
| 5,446,251 A | 8/1995 | Lin | ............ | 200/284 |
| 5,453,590 A | 9/1995 | Mayer | ............ | 200/461 |
| 5,467,068 A | 11/1995 | Field et al. | ............ | 335/4 |
| 5,475,353 A | 12/1995 | Roshen et al. | ............ | 335/78 |
| 5,489,556 A | 2/1996 | Li et al. | ............ | 437/228 |
| 5,503,029 A | 4/1996 | Tamori | | |
| 5,515,738 A | 5/1996 | Tamori | ............ | 73/862.46 |
| 5,526,701 A | 6/1996 | Tamori | ............ | 73/862.046 |
| 5,531,018 A | 7/1996 | Saia et al. | ............ | 29/622 |
| 5,554,964 A | 9/1996 | Jansseune | ............ | 335/207 |
| 5,558,210 A | 9/1996 | Jonischus | ............ | 200/321 |
| 5,623,552 A | 4/1997 | Lane | | |
| 5,637,904 A | 6/1997 | Zettler | ............ | 257/417 |
| 5,638,946 A | 6/1997 | Zavracky | ............ | 200/181 |
| 5,652,559 A | 7/1997 | Saia et al. | ............ | 335/78 |
| 5,778,513 A | 7/1998 | Miu et al. | ............ | 29/602 |
| 5,810,604 A | 9/1998 | Kopp, Jr. et al. | ............ | 434/317 |
| 5,821,596 A | 10/1998 | Miu et al. | ............ | 257/419 |
| 5,828,268 A | 10/1998 | Ando et al. | ............ | 330/124 D |
| 5,844,287 A * | 12/1998 | Hassan et al. | ............ | 257/419 |
| 5,864,296 A | 1/1999 | Upton | ............ | 340/825.3 |
| 5,905,241 A | 5/1999 | Park et al. | ............ | 200/409 |
| 5,940,525 A * | 8/1999 | Itsumi | ............ | 382/124 |
| 5,946,176 A | 8/1999 | Ghoshal | ............ | 361/56 |
| 5,994,796 A | 11/1999 | De Las Santos | ............ | 307/113 |
| 6,020,564 A | 2/2000 | Wang et al. | ............ | 200/181 |
| 6,034,339 A | 3/2000 | Pinholt et al. | ............ | 200/181 |
| 6,037,719 A | 3/2000 | Yap et al. | ............ | 315/169.3 |
| 6,067,368 A | 5/2000 | Setlak et al. | ............ | 382/124 |
| 6,578,436 B1 | 6/2003 | Ganapathi | | |

FOREIGN PATENT DOCUMENTS

| | | |
|---|---|---|
| DE | 196 315 69 | 2/1998 |
| EP | 0459808 | 4/1991 |
| EP | 0 650 139 | 10/1994 |
| EP | 0769754 | 4/1997 |
| GB | 2243235 | 10/1991 |
| WO | WO 97/25798 | 7/1997 |

OTHER PUBLICATIONS

McGraw-Hill Dictionary of Scientific and Technical Terms; 2003; McGraw-Hill Companies, Inc.; Sixth Edition; p. 1565.*

* cited by examiner

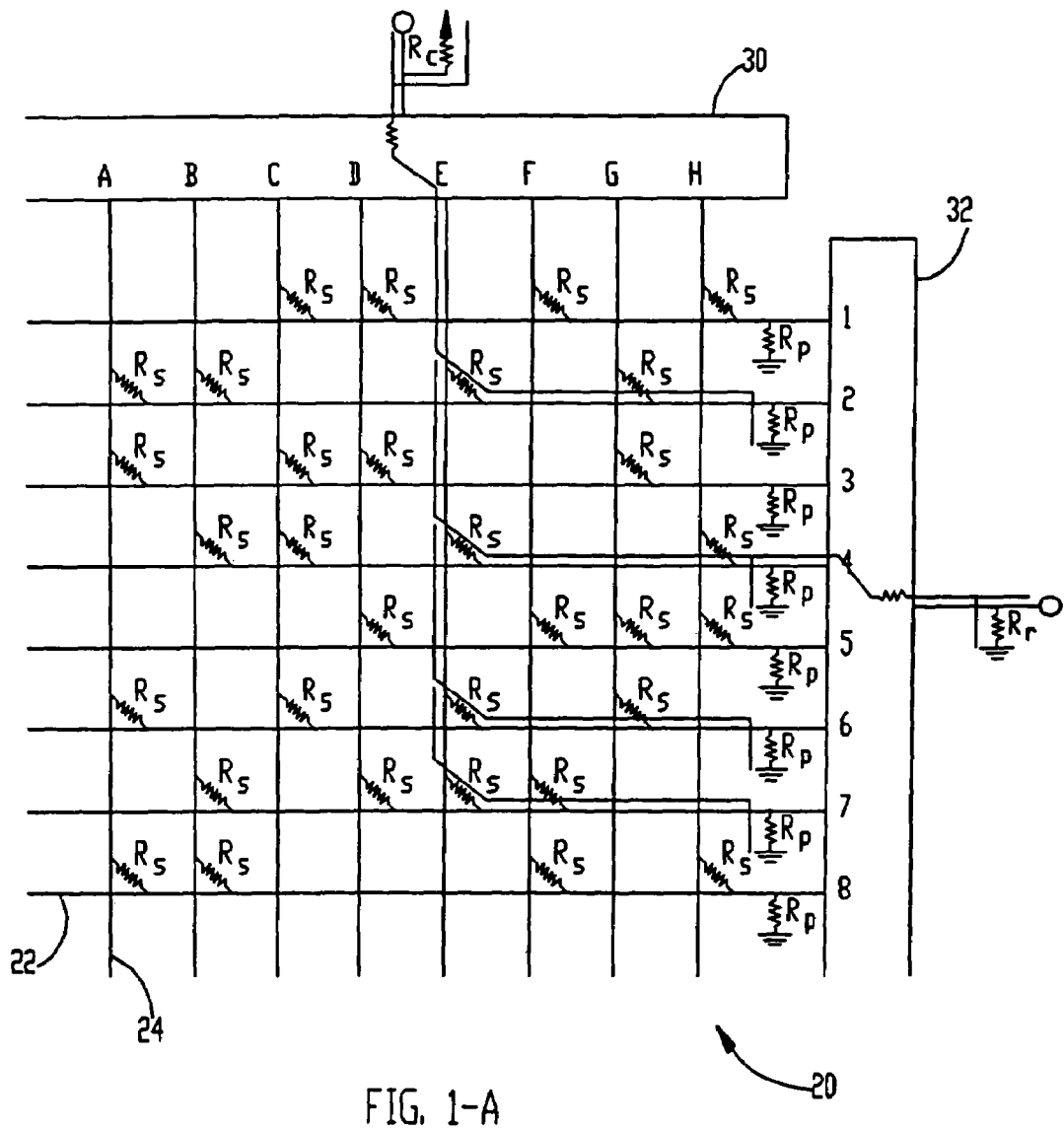
FIG. 1-A

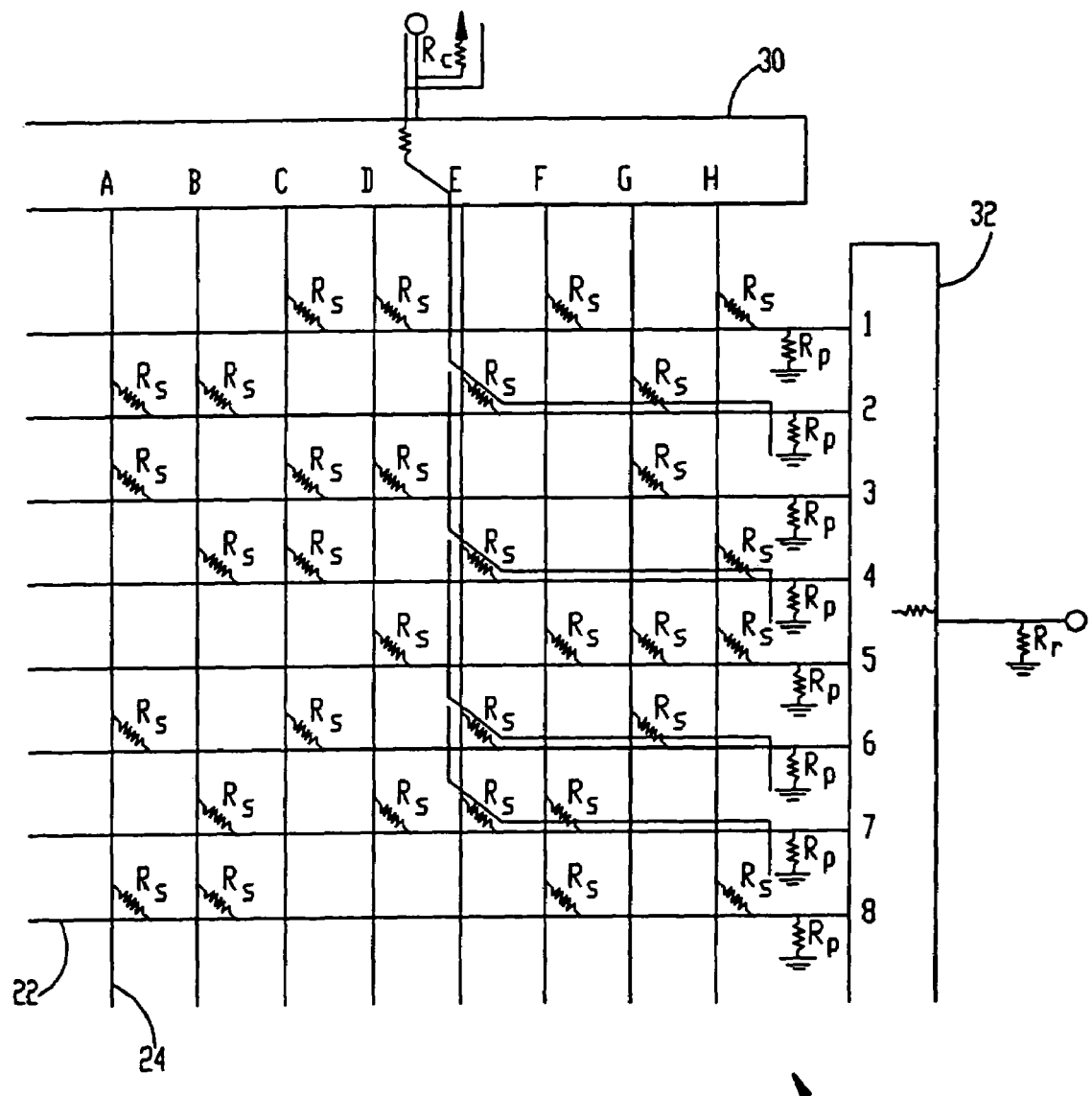
FIG. 1-B

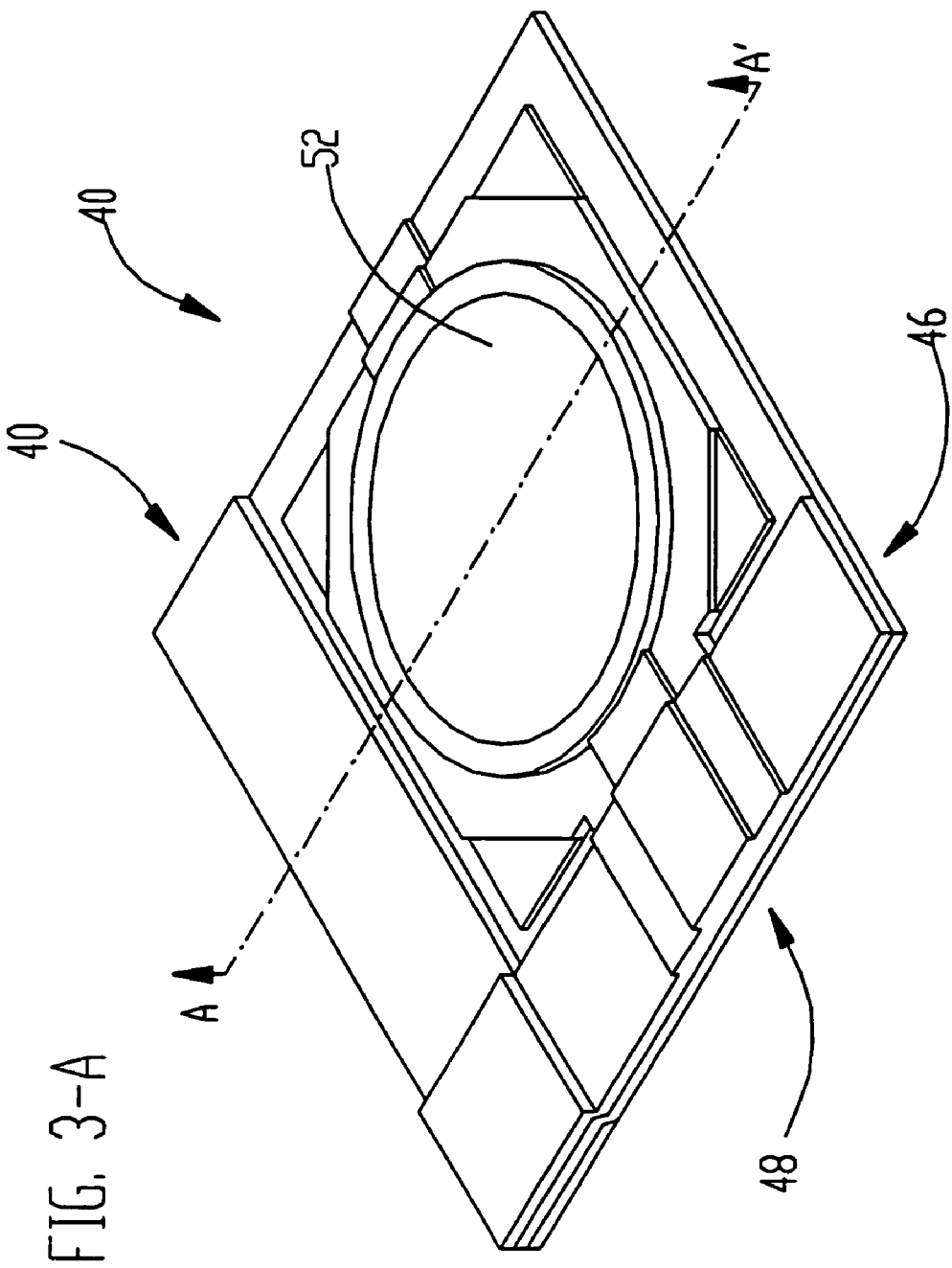
FIG. 3-A

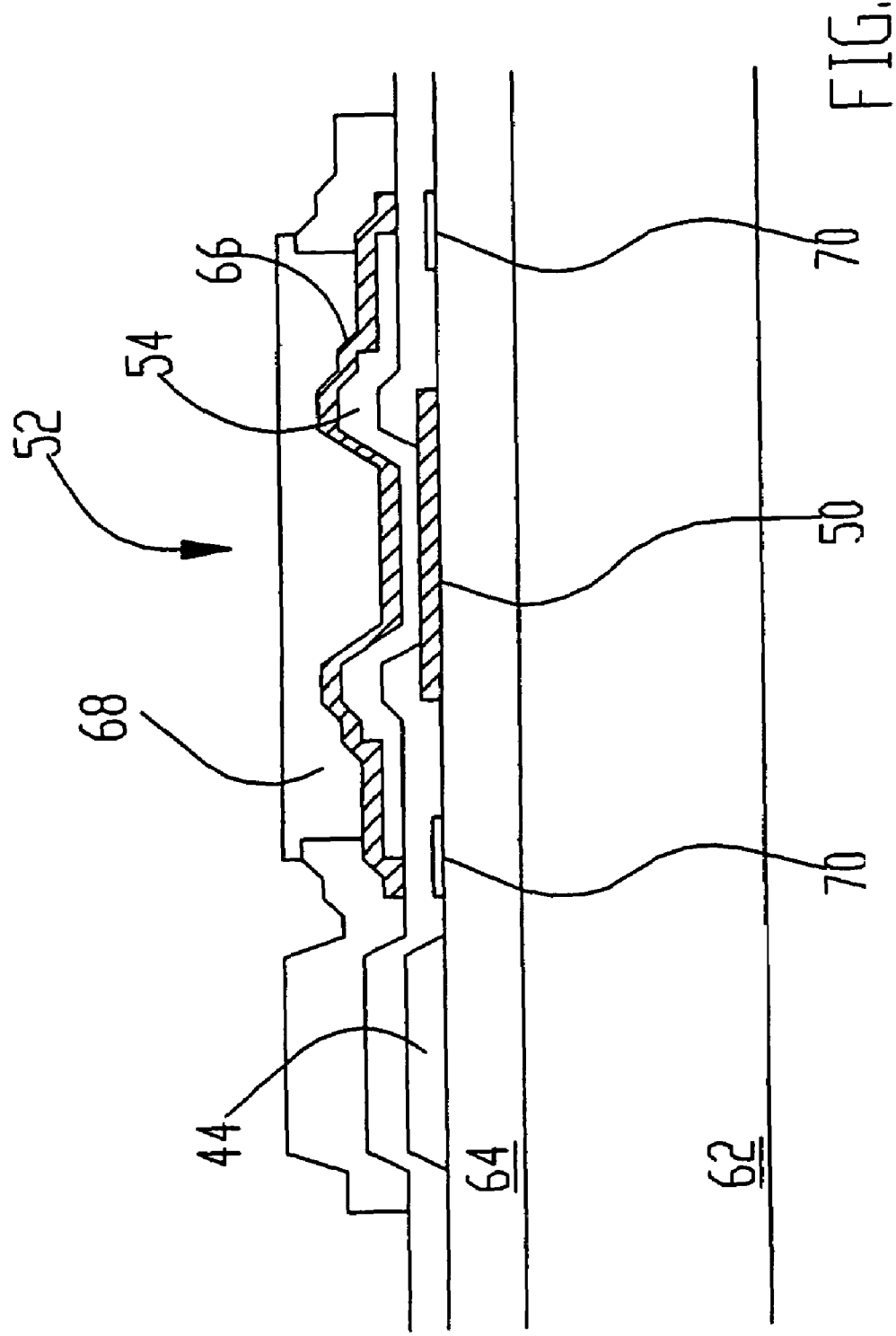
FIG. 3-B

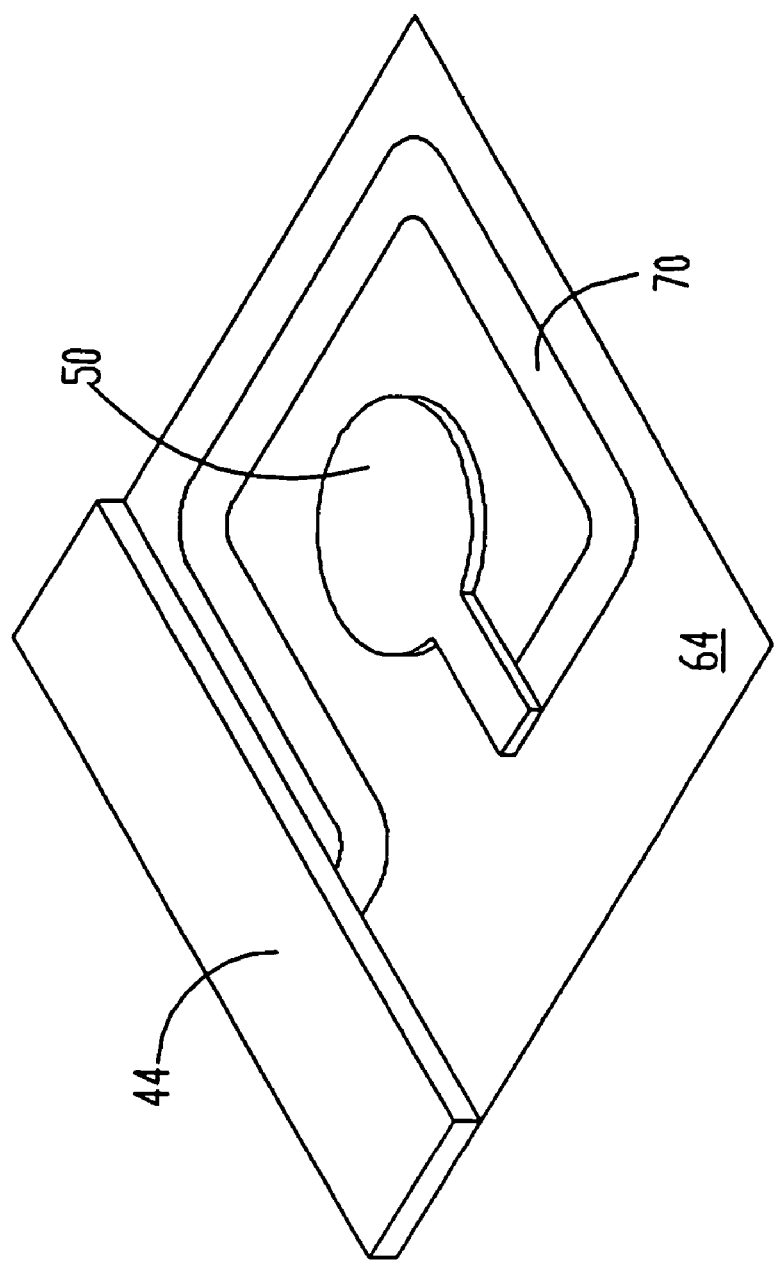
FIG. 4-A

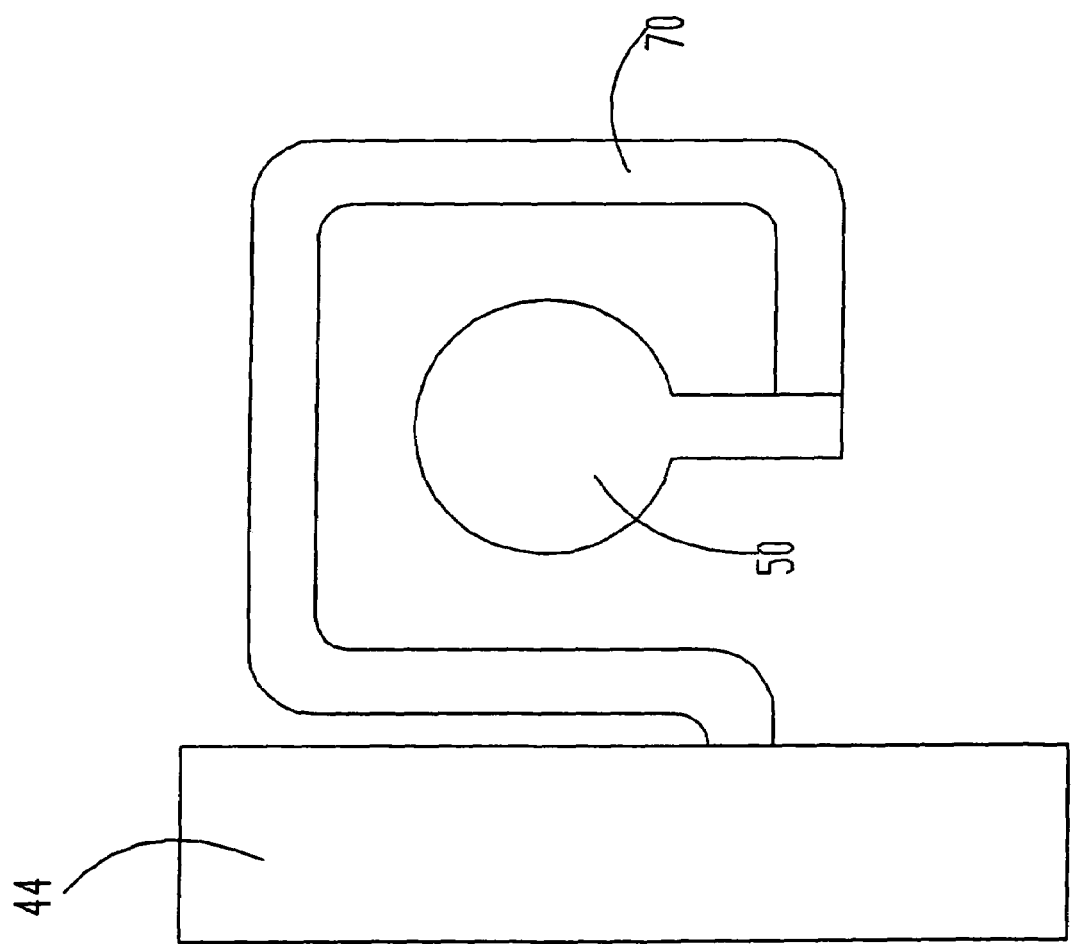
FIG. 4-B

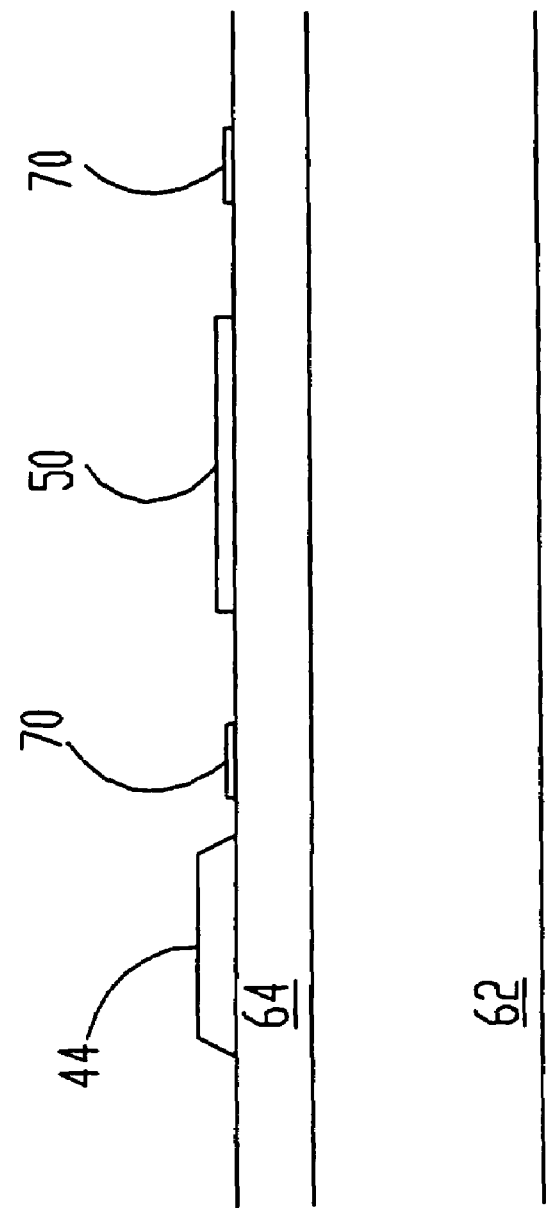
FIG. 4-C

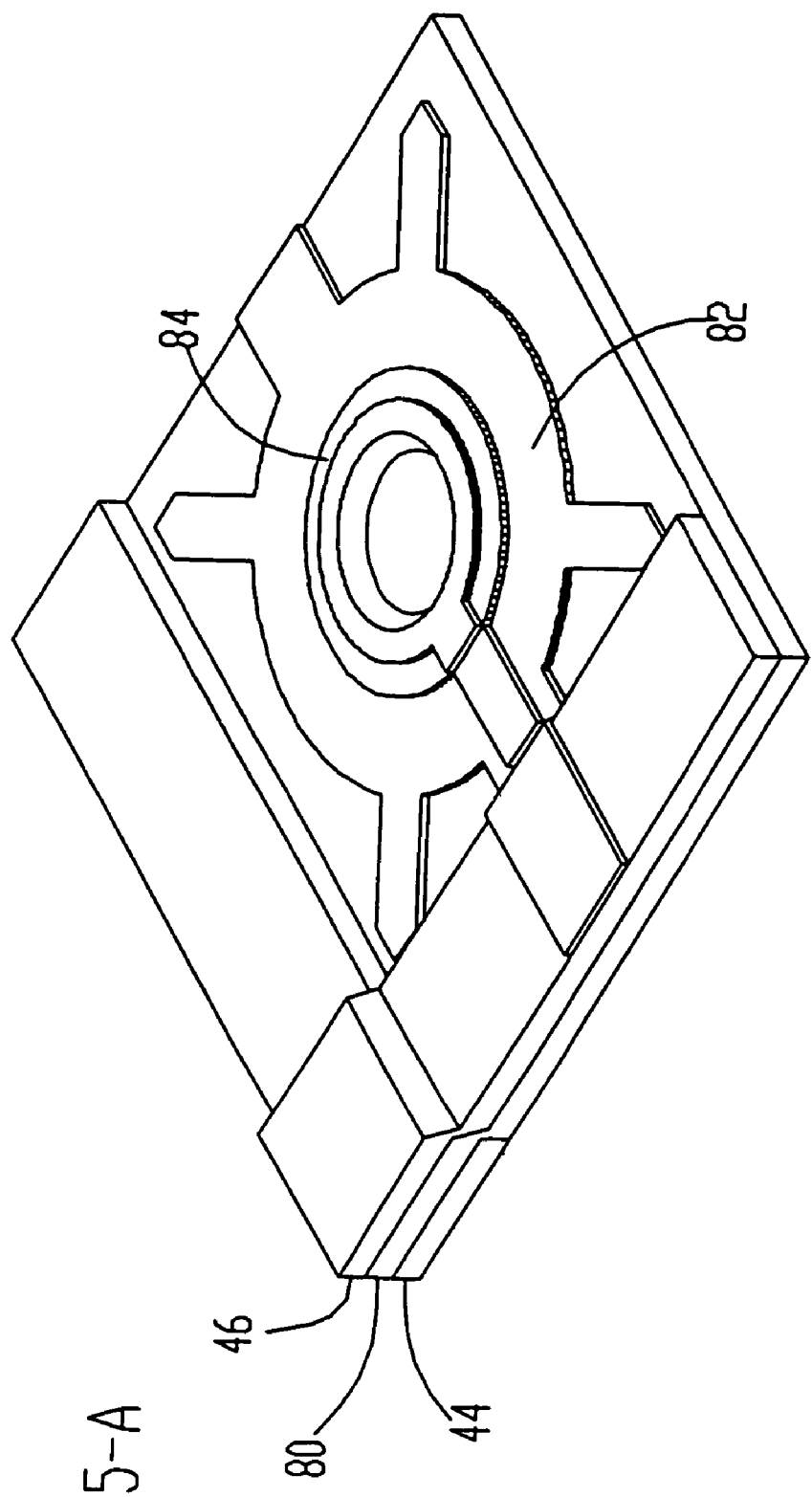
FIG. 5-A

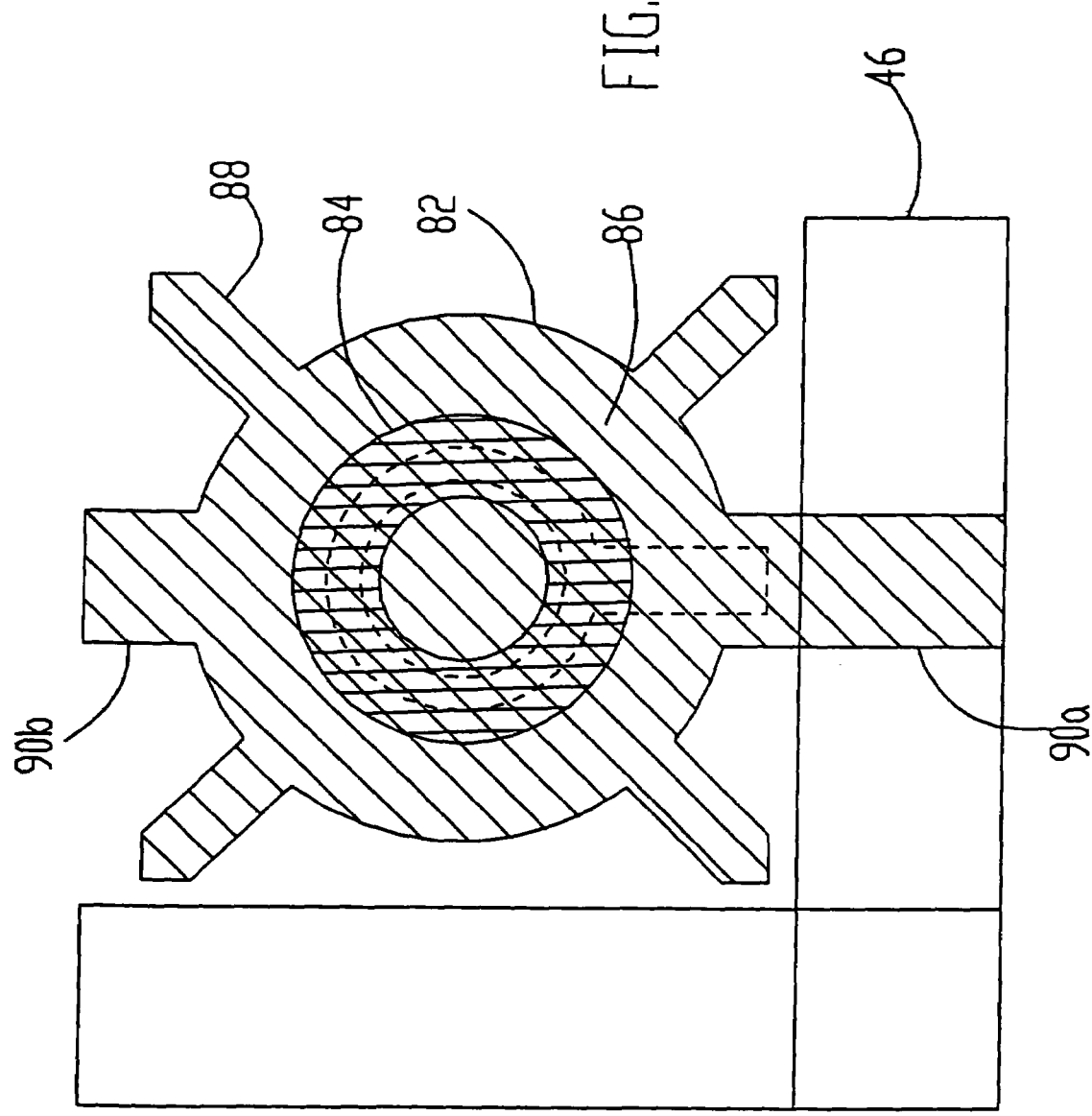

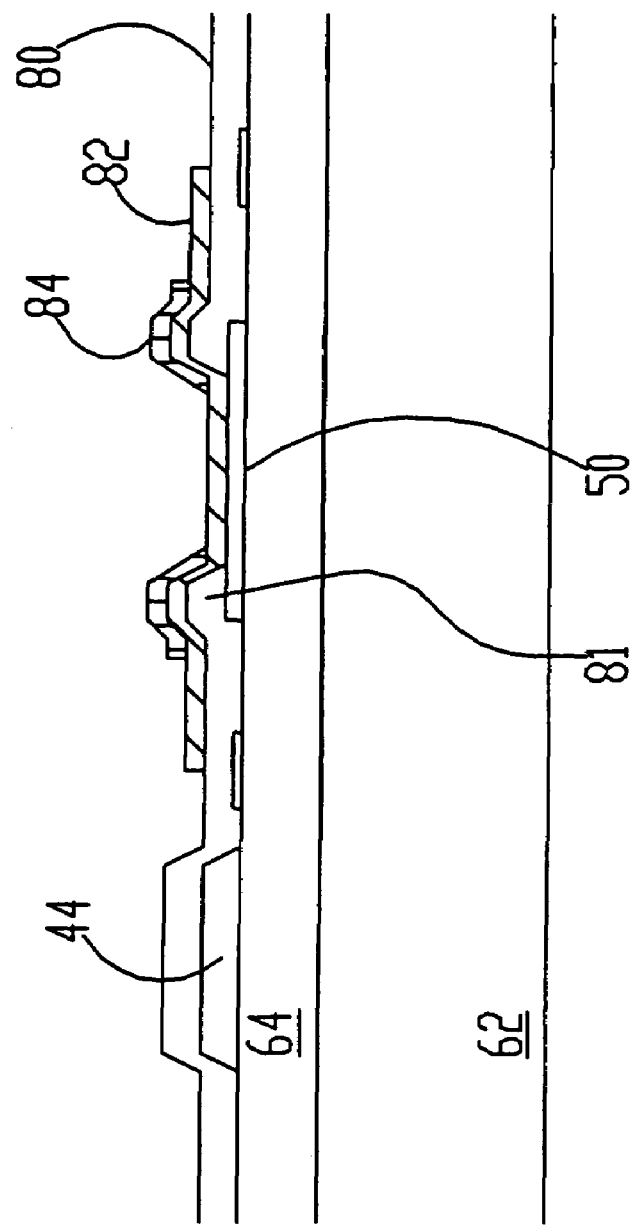
FIG. 5-C

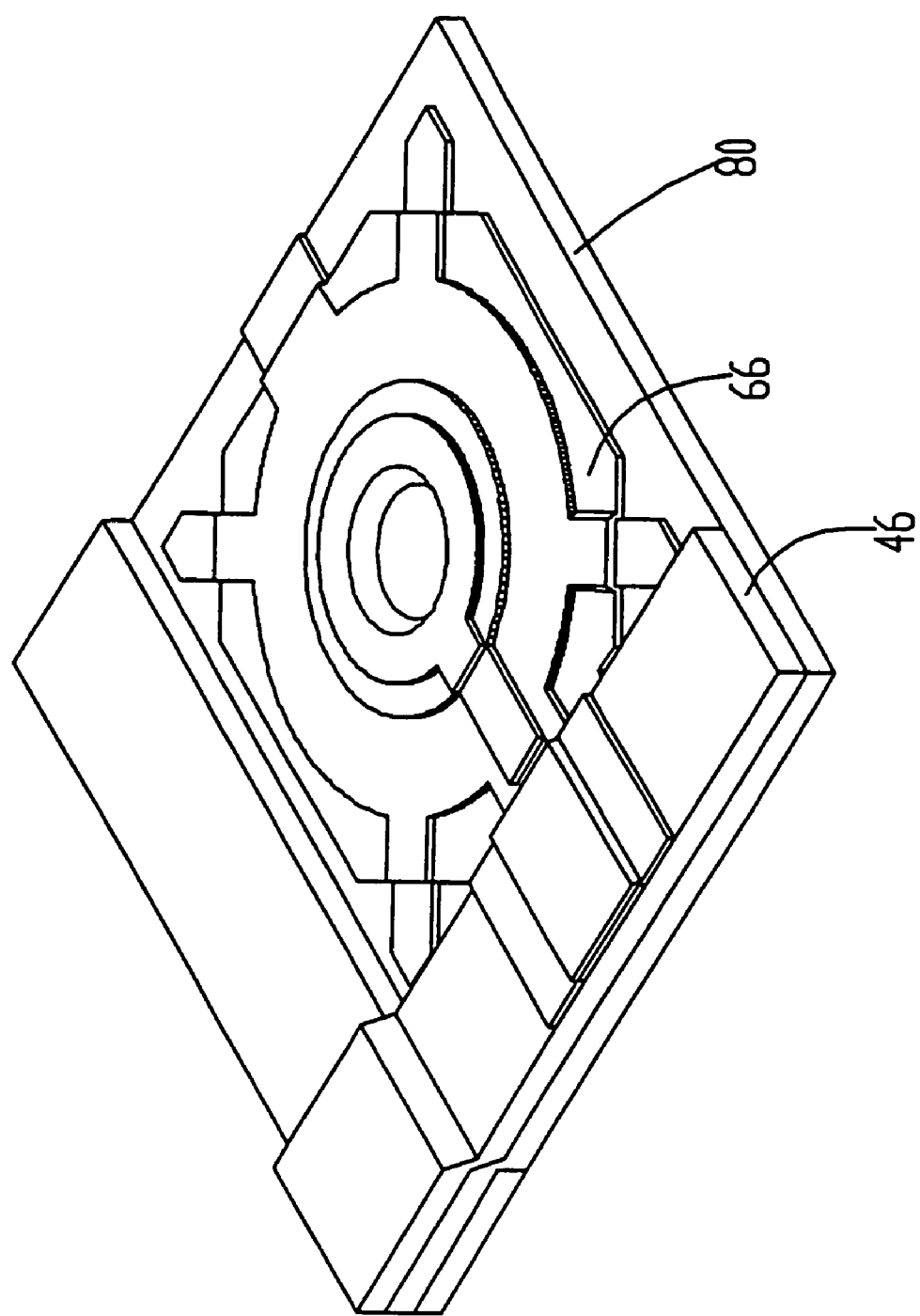
FIG. 6-A

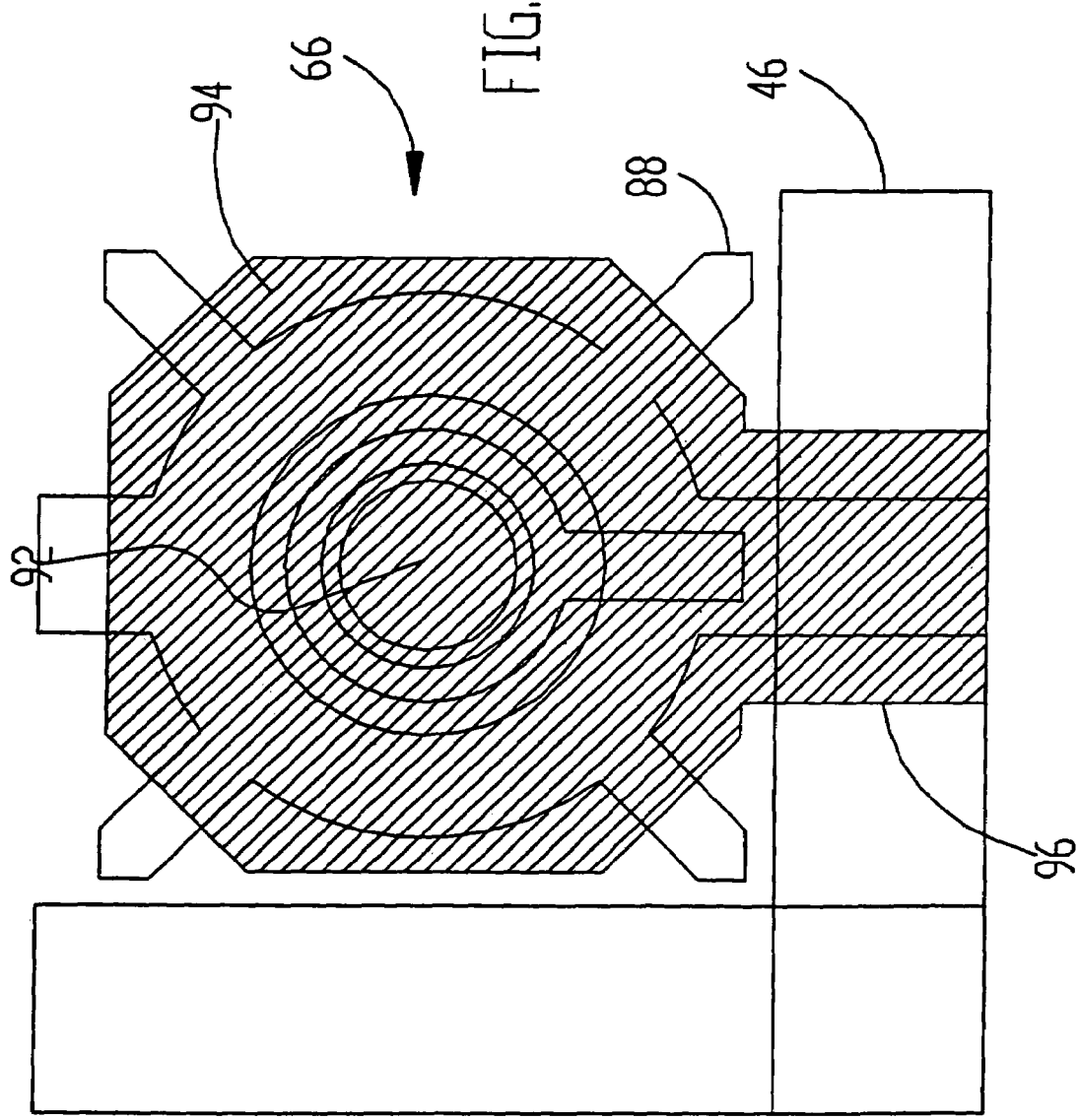
FIG. 6-B

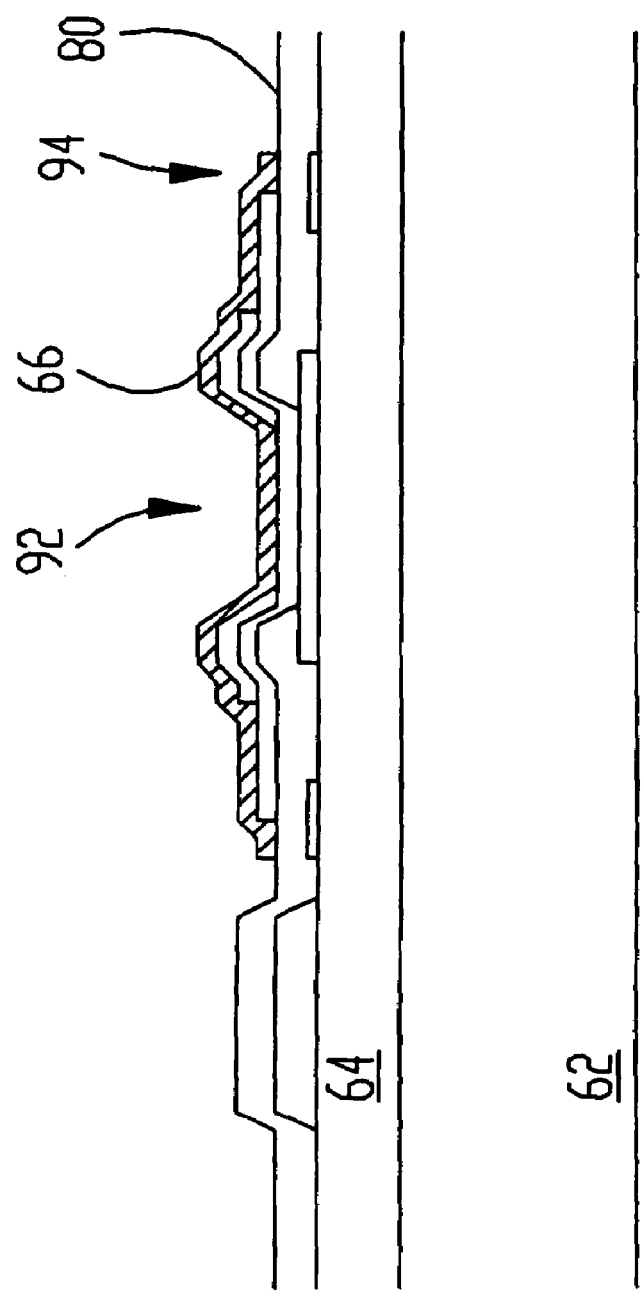
FIG. 6-C

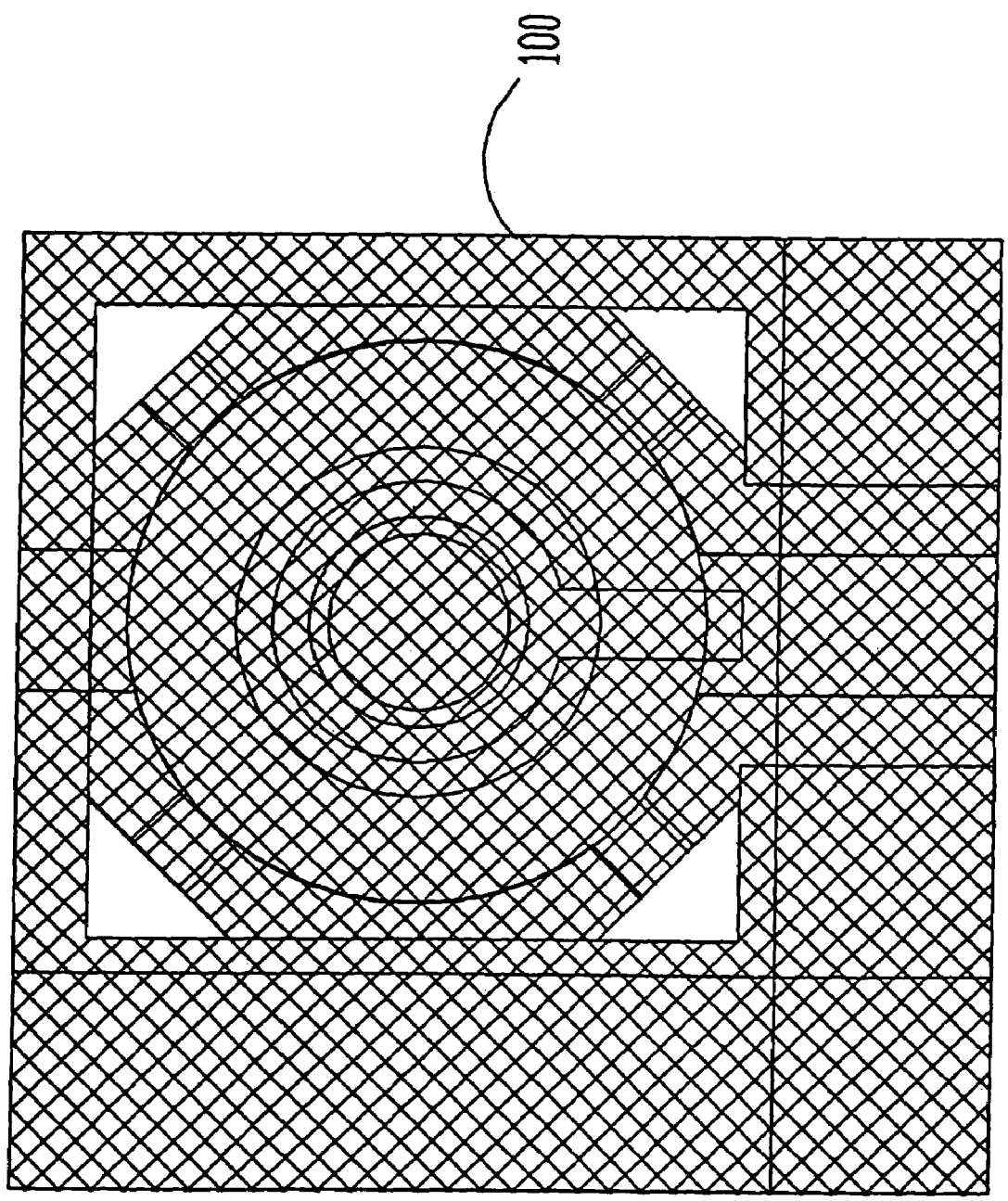
FIG. 7-A

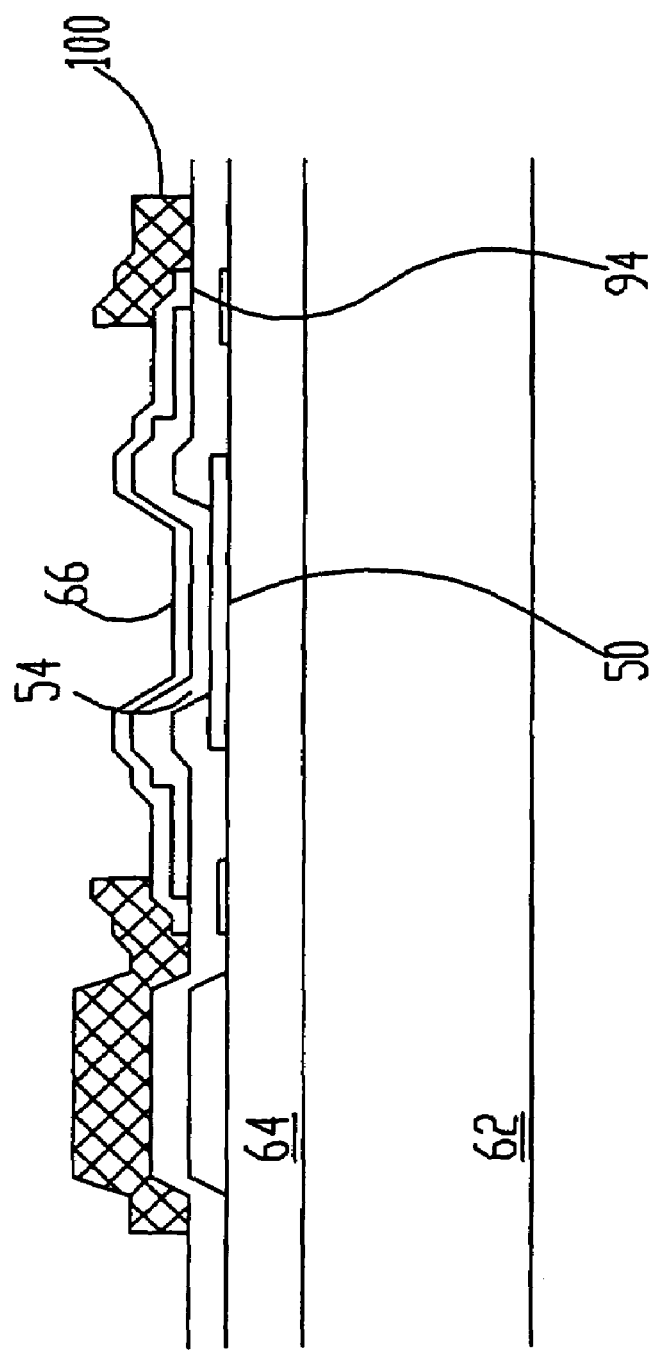
FIG. 7-B

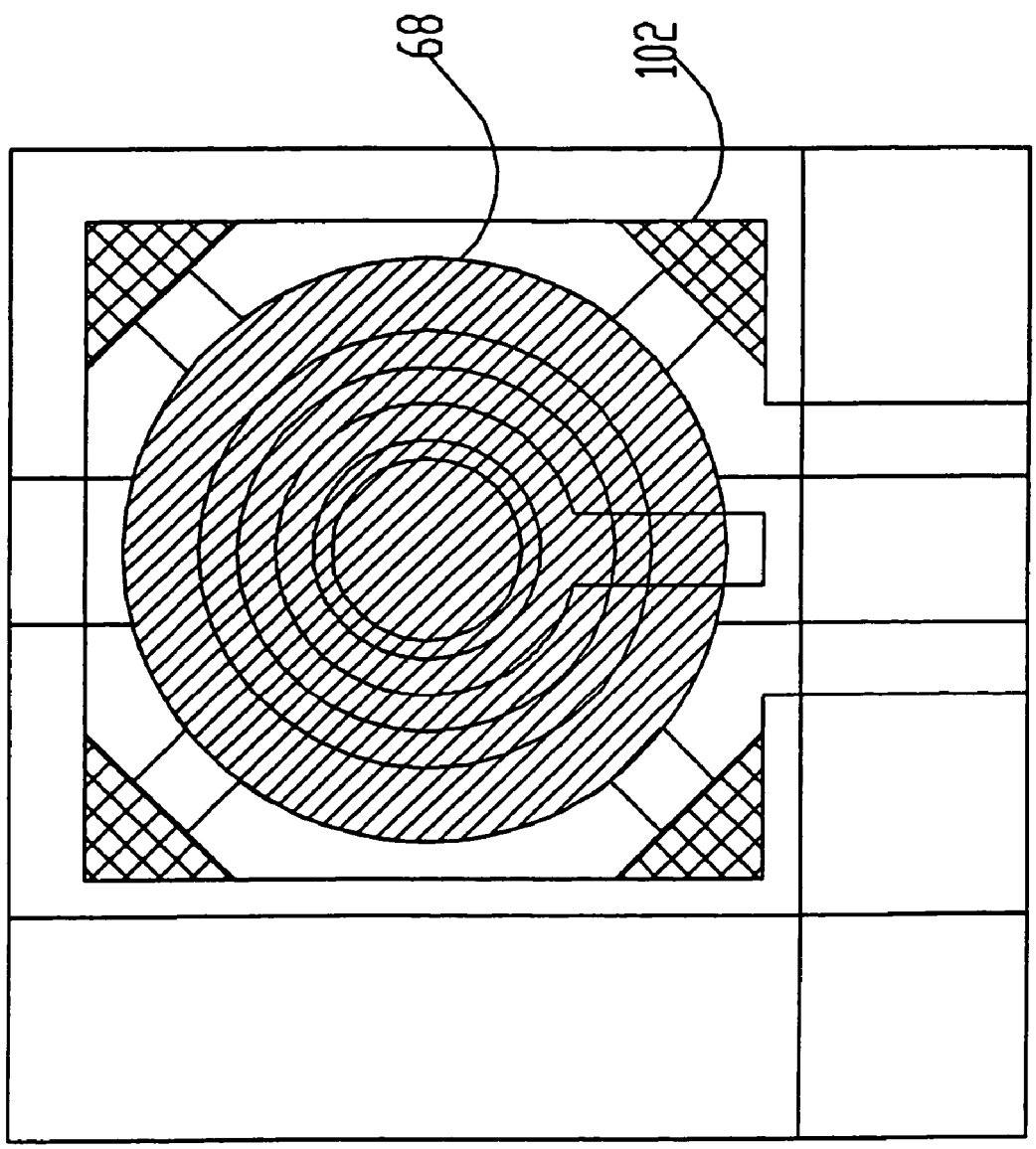
FIG. 8-A

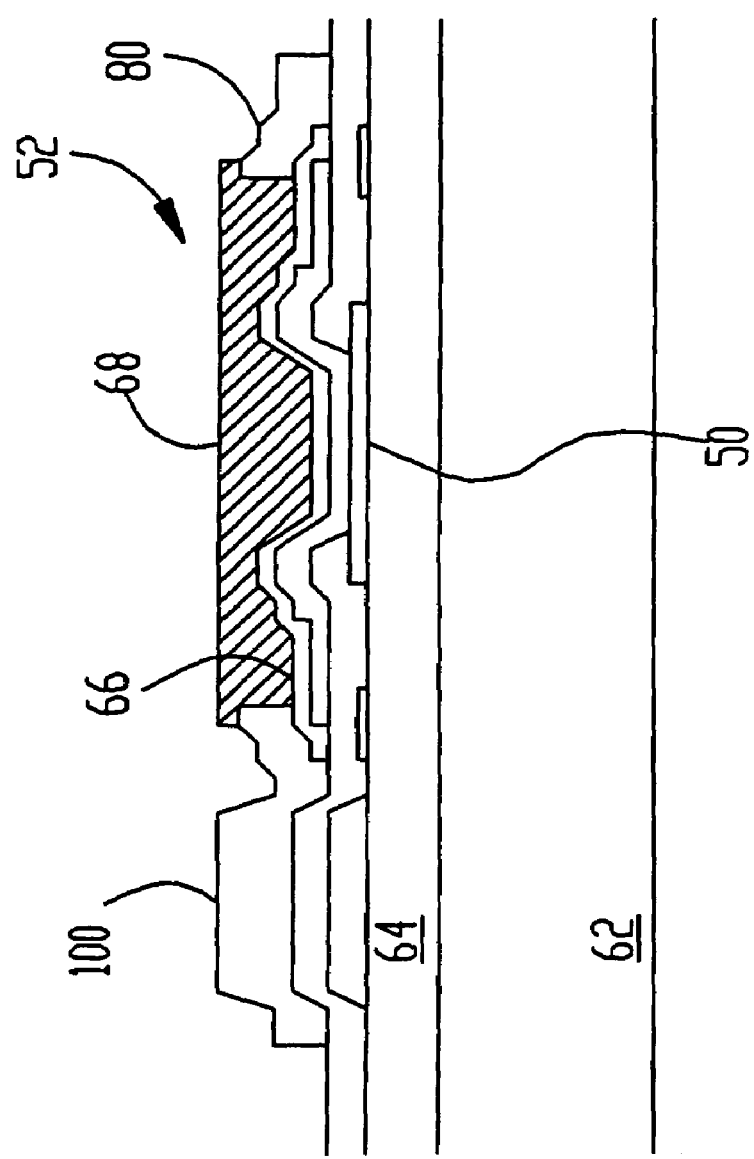

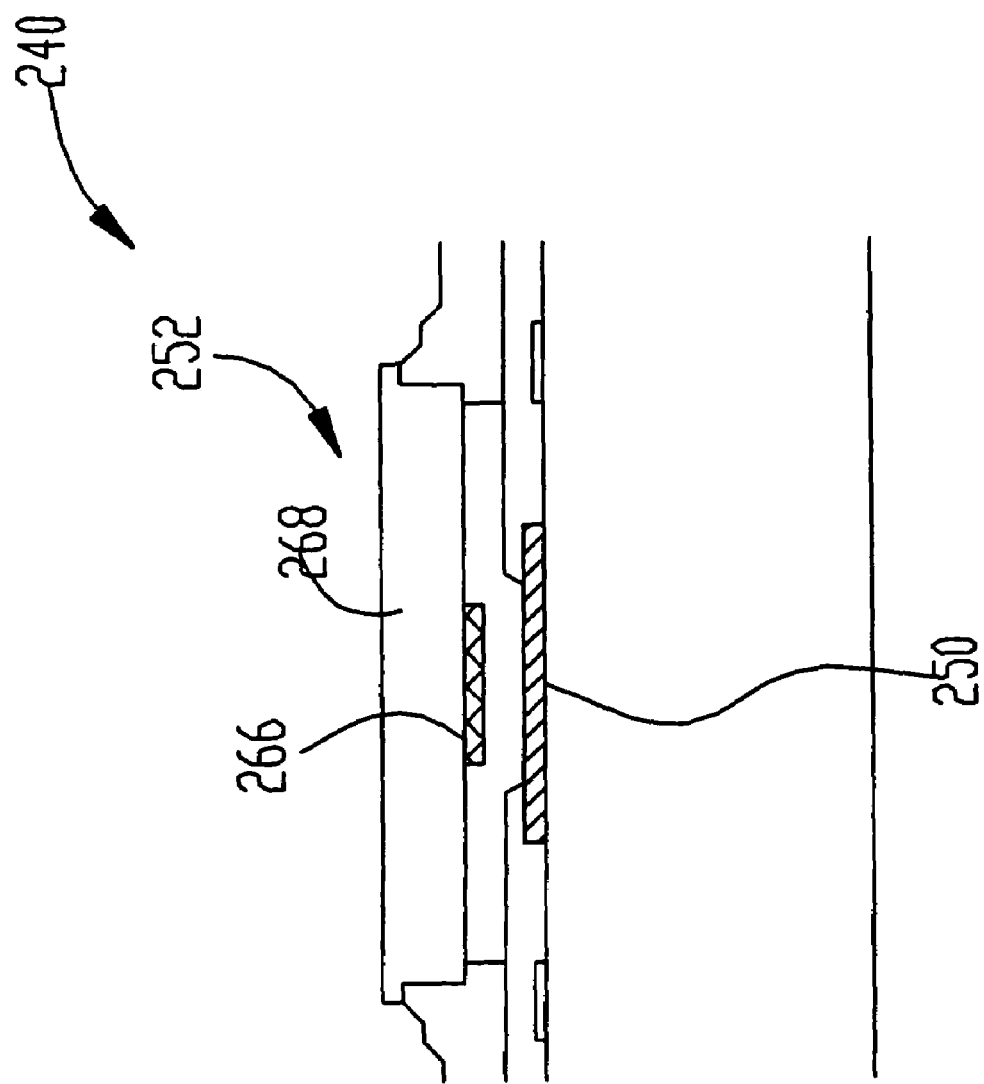
FIG. 9-A

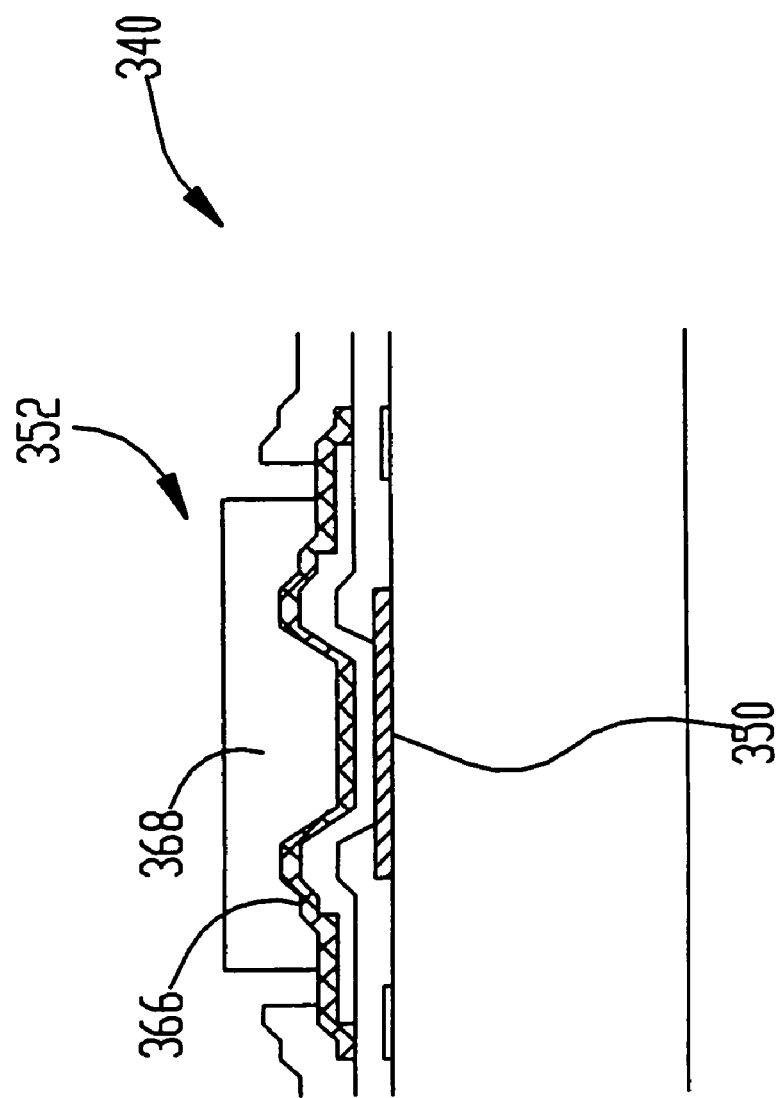
FIG. 9-B

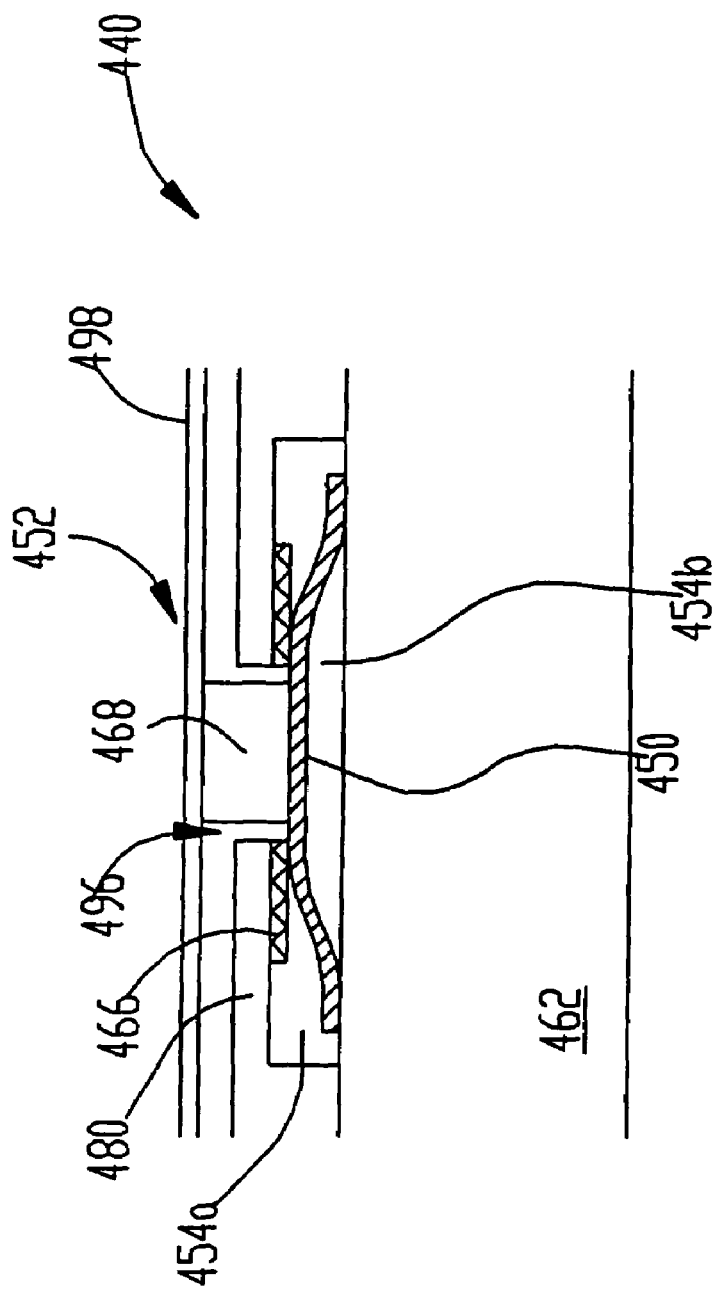

FINGERPRINT SENSORS USING MEMBRANE SWITCH ARRAYS

RELATED APPLICATION DATA

This application is a divisional of U.S. patent application Ser. No. 10/038,505 filed Dec. 20, 2001, now U.S. Pat. No. 6,889,565 which is a continuation-in-part of U.S. patent application Ser. No. 09/571,765, filed May 16, 2000, now U.S. Pat. No. 6,578,436, which are incorporated by reference herein.

FIELD OF THE INVENTION

The invention relates to biometric identification systems and methods, and in particular to fingerprint or skin texture identification systems and methods using switch arrays.

BACKGROUND OF THE INVENTION

The fingerprint sensing industry uses several different conventional technologies to capture images of an individual's fingerprints. Two prominent technologies are optical-based sensors and capacitance-based sensors. In a typical optical sensor, a light source, lenses and a prism are used to image the ridges and valleys on a fingerprint, based on differences in the reflected light from the features. Conventional capacitance sensors include two-dimensional array of capacitors defined on a silicon chip, and fabricated by semiconductor CMOS processing. The individual sensors on the chip form one plate of the parallel plate capacitor, while the finger itself, when placed on the array, acts as the second plate for the various localized sensors. Upon contact with the array of sensors, the individual distance from each sensor to the corresponding point on the skin above the sensor is measured using capacitive techniques. The difference in distance to skin at the ridges and valleys of a fingerprint identifies the fingerprint.

Capacitive and optical sensors can be sensitive to oils or grease on the finger and to the presence or absence of moisture on the finger. In addition, the ambient temperature can affect these sensors at the time of sensing. Under hot or cold conditions, capacitive sensors can provide erroneous readings. Finally, most sensors have abrasion resistant coatings. The thickness of the protective coating can affect the measurements. The combined effect of these variables can result in distorted fingerprint images. Finally, in the case of silicon chip based fingerprint sensors, the placement of the finger directly onto the silicon increases the risk of electrostatic discharge and damage to the sensor.

Accordingly, there remains a need for a device suitable for use as a texture image capture sensor that has high sensitivity, yet can provide high lateral resolution. Moreover, there further remains a need for a sensor that is suitable for use in fingerprint image capture that is less sensitive to adverse conditions such as extreme temperatures and skin oils and grease.

SUMMARY OF THE INVENTION

A texture sensor for sensing a texture having a plurality of protrusions and a plurality of valleys, such as a fingerprint or other skin texture, includes an array of membrane switches disposed on a base. Each membrane switch comprises a fixed electrode rigidly coupled to the base, and a flexible upper membrane structures disposed over the base such that a cavity separates a central region of the membrane structure and the base. The membrane structure comprises a movable electrode disposed facing the fixed electrode. Disposing a protrusion of the texture over the membrane switch causes a flexure of the membrane resulting in a change in contact state between the fixed electrode and the movable electrode. Disposing a valley of the texture over the membrane switch does not result in the change in contact state between the fixed electrode and the movable electrode.

BRIEF DESCRIPTION OF THE DRAWINGS

The foregoing aspects and advantages of the present invention will become better understood upon reading the following detailed description and upon reference to the drawings where:

FIGS. 1-A and 1-B are schematic diagrams of a switch array forming part of a sensing circuit according to the preferred embodiment of the present invention.

FIGS. 3-A and 3-B show isometric and side sectional views, respectively, of a membrane switch according to the preferred embodiment of the present invention.

FIGS. 4-A, 4-B, and 4-C show isometric, top, and side sectional views, respectively, of the structure resulting after a lower electrode is formed on a sensor substrate, according to the preferred embodiment of the present invention.

FIGS. 5-A, 5-B, and 5-C show isometric, top, and side sectional views, respectively, of the structure resulting after the formation of a pair of sacrificial layers above the lower electrode, according to the preferred embodiment of the present invention.

FIGS. 6-A, 6-B, and 6-C show isometric, top, and side sectional views, respectively, of the structure resulting after an upper electrode membrane is formed above the sacrificial layers, according to the preferred embodiment of the present invention.

FIGS. 7-A and 7-B illustrate, in top and side sectional views, respectively, the formation of a protective field oxide over the structure of FIGS. 6-A through 6-C, according to the preferred embodiment of the present invention.

FIGS. 8-A and 8-B illustrate, in top and side sectional views, respectively, the formation of a polymer diaphragm and vent seals on the structure of FIGS. 7-A, 7-B, according to the preferred embodiment of the present invention.

FIGS. 9-A through 9-C show side sectional views of three membrane switches according to alternative embodiments of the present invention.

DETAILED DESCRIPTION OF THE INVENTION

Figure 2:
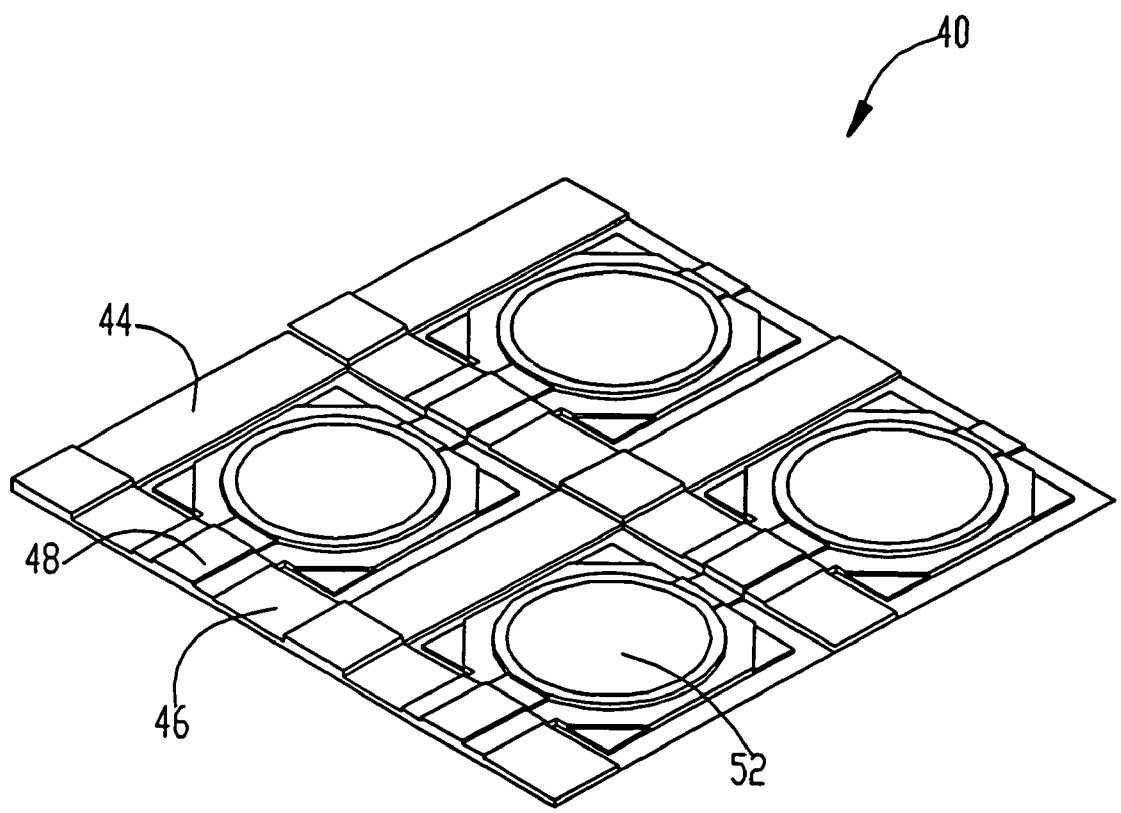
FIG. 2 shows an isometric view of four adjacent membrane switches according to the preferred embodiment of the present invention.

In the following description, it is understood that each recited element or structure can be formed by or be part of a monolithic structure, or be formed from multiple distinct structures. Unless otherwise specifically stated, the statement that a first layer or structure is disposed or deposited on a second layer or structure is understood to allow for the presence of parts of the first or second layer or structure that are not so disposed or deposited, and further allow for the presence of intermediate layers or structures between the first and second layers or structures. The terms "chip base" and "chip substrate" are understood to encompass monolithic substrates as well as structures containing multiple layers or parts. The terms "upper" and "lower" are used to describe relative positions, and do not necessarily refer to the direction of gravity during operation of the sensor. A set of elements is understood to include one or more elements. A plurality of elements is understood to include two or more elements. Any recitation of an element is understood to refer to at least one element.

The following description illustrates embodiments of the invention by way of example and not necessarily by way of limitation.

FIGS. 1-A and 1-B are schematic diagrams illustrating the electrical connections of a fingerprint or texture sensor 20 according to the preferred embodiment of the present invention. Sensor 20 comprises an array of switches (cells) spaced from each other by an appropriate distance that is a fraction of the inter-ridge spacing of the fingerprint or skin texture to be sensed. The preferable range of this fraction is ½ to ¹/₂₀. Typical spacings between fingerprint ridges are 400-500 μm. Each switch corresponds to an intersection of a row line and a column line illustrated in FIGS. 1-A and 1-B. Closed switches are denoted by their associated resistances $R_s$. The 8×8 switch array illustrated in FIGS. 1-A and 1-B is part of a larger m×n array.

A plurality of metallic leads arranged in an m x n orthogonal grid and electrically isolated from each other serve as the electrical input and output lines for each switch. The orthogonal grid of metallic leads comprises conductive rows 22 and columns 24, which lead into and out of each switch. Each row/column combination of conducting leads corresponds uniquely to a specific switch in the array. Each switch is addressed by applying a voltage and sensing a current between the row and column leads corresponding to the switch.

Each column lead 24 is connected to an input of a column multiplexer 30, while each row lead 22 is connected to an input of a row (downstream) multiplexer 32. Column multiplexer 30 and row multiplexer 32 are used to individually address each of the switches in the matrix, and thereby determine the state (open or closed) of each switch. Such multiplexers and the manner of causing the addressing of each switch are known, and thus a detailed description thereof is not necessary for an understanding of the present invention.

Each switch includes a lower conductive electrode, and a membrane structure including an upper electrode disposed over the lower electrode. The lower electrode of each switch is electrically connected to a column (or row) lead, and the upper conducting electrode is electrically connected to a row (or column) lead. Since the row and column conductor leads are electrically isolated from each other, the switch is electrically open in the quiescent state, and no current passes between the row and the column corresponding to the switch.

When a fingerprint is placed on the sensor, the upper electrodes of certain switches are pressed downward by the ridges of the fingerprint, while the upper electrodes of the other switches are not sufficiently deflected to close the switches. With appropriate design and fabrication of the switches, the upper electrodes deflect downward and establish contact with the corresponding lower electrodes when a ridge of a fingerprint is applied to the switches. The upper electrodes then revert to their original positions when the ridge of the fingerprint is removed. If a switch in the array resides directly beneath a ridge of the fingerprint, it is deflected and the switch is closed. If a switch resides beneath a valley of the fingerprint, then it is not deflected and it remains open. When closed, a switch establishes electrical contact between the row and column corresponding to that switch. In this way, one can generate a map of the contact points or the ridges on the fingerprint, and get an accurate reproduction of the fingerprint.

An electrical circuit such as a conventional counter, shift register and operational amplifier attached to a multiplexer, combined with voltage sources and current/voltage detectors can be used to detect the output current or voltage from the row/column being addressed. The magnitude of the output current indicates whether a particular switch is closed or open. Each switch can be polled individually using the multiplexer and simple controlling electronics and software to acquire a map of the closed switches. The switch map represents a map of the fingerprint image, since the image is a reproduction of the ridges on the fingerprint.

A large resistive device is preferably placed in series with each switch in the array so that one can easily distinguish between the open and closed states of the switch when the switch is polled. The resistive device is preferably a passive resistor with a resistance of 5,000Ω to 500,000Ω. Other suitable resistive devices include active devices such as p-n diodes with low forward resistance and low leakage current characteristics, field effect transistors, thin film transistors, and other types of transistors with similar characteristics. A pull-down resistor $R_p$ is connected between ground and each input of downstream multiplexer 32. Pull-down resistor $R_p$ is preferably a passive resistor with a resistance of approximately 50-250Ω. Pull-down resistor $R_p$ and the resistor placed in series with each switch facilitate the reliable detection of the state (open/closed) of each switch. Ascertaining the state of the switch relies on detecting a significant difference in the voltages (or currents) measured for the closed and open states of the switch.

Consider a source of constant current, sourcing from the column multiplexer 30 and sinking through the row or downstream multiplexer 32. FIG. 1-A illustrates the current paths through sensor 20 as column E and row 4 are addressed. Addressing column E and row 4 is used to determine the state of the switch E4. The current that passes down the addressed column E encounters a parallel network of closed and open switches. Each of rows 2, 4, 6, and 7 contains a closed switch along column E. Only the closed switches provide current paths through the sensor, since the open switches provide essentially infinite impedance. The pull-down resistors $R_p$ at the inputs of the row multiplexer 32 are selected such that each closed switch on the addressed column, including the switch on the addressed row, presents approximately the same resistance to the current.

The current passing through column E is split evenly between all the closed switches $R_s$ along column E, in this case the closed switches $R_s$ on rows 2, 4, 6, and 7. If there are no closed switches on the addressing column, then the current that flows through the switch being addressed can be approximated by I/n, where I is the total source current. Some of the current that makes its way to the addressed row is lost when it shunts back out through the closed switches on the addressed row. However, by making the switch resistance adequately high, this shunting can be reduced to a small fraction of the current that sinks through row multiplexer 32. Additionally, some of the current distributed throughout the fingerprint array does not sink through the various row pull-downs and makes its way back to the addressed row, increasing the current detected by the circuit.

FIG. 1-B illustrates the current paths through sensor 20 as column E and row 5 are addressed. Row 5 does not share any of the initial current that is split between the closed switches $R_s$ on rows 2, 4, 6, and 7 on the addressed column E. The only current in the addressed row 5 is a portion of the current that does not sink through the various pull-down resistors $R_p$ on the rows 2, 4, 6, and 7 with closed switches $R_s$ on the addressed column E.

The ratio of currents through the row multiplexer 32 for a closed versus an open switch can be considered to be the quality factor for detecting the state of any switch in the array. An equation that approximates this ratio is:

$$I_{closed}/I_{open}=1+NX/n(1-X) \quad [1]$$

wherein $X=(R_{sw}/n+R_{sw}/n^2+R_{pd}/n^2)/(R_{pd}+R_{sw}/n+R_{sw}/n^2+R_{pd}/n^2)$,
$R_{sw}$=Resistance in series with each switch,
$R_{pd}$=Pull-down resistance at inputs to the row multiplexer,
N=Total number of switches in any given row or column,
n=Average number of closed switches on any given row or column.

Some typical values for the parameters in the above equations are:
$R_{sw}$=100,000Ω
$R_{pd}$=100Ω
N=256 Switches
n=128 Switches
X=0.887 which yields a current ratio or quality factor of $I_{closed}/I_{open}$=16.7, a ratio that is large enough to provide resolution in distinguishing between a closed and an open switch.

In accordance with an aspect of a method of fingerprint identification/verification in accordance with the invention, before fingerprint measurements are performed, the quiescent impedance of each switch is measured in order to determine whether there is a stress on a particular switch. Measuring the quiescent impedance of each switch with no finger on the sensor provides a baseline measurement value for the switch. The baseline can be established either immediately prior to or immediately following the imaging of the fingerprint. The impedance measurement for each switch is repeated with the finger on the sensor, and the switches that have changed state from electrically open to electrically closed are recorded. The state-change information is mapped for the entire switch array to obtain an image of the fingerprint.

Comparing fingerprint measurements to the baseline allows a reduction of the effect of ambient temperature, humidity, and stress on the measurements. The baseline comparison also reduces the effect of individual bad sensors that are electrically closed prior to the application of the fingertip. Some switches may be closed or may appear to be closed in the absence of applied pressure, due to processing errors or undue deflection of some membranes.

FIG. 2 shows an isometric view of four adjacent switches 40 forming part of sensor 20, according to the preferred embodiment of the present invention. As illustrated, switches 40 are disposed in a cartesian array along a planar surface, and are electrically interconnected by row leads 44 and column leads 46. The interiors of the switches 40 disposed along each row are interconnected through tunnels 48, such that the interior chambers of the switches 40 disposed along each row define a common space. Tunnels 48 provide pathways for equalizing the pressures within the chambers of different switches 40. Such pressure differences can affect the force required to close different switches 40.

FIGS. 3-A and 3-B show isometric and side sectional views, respectively, of a membrane switch 40 according to the preferred embodiment of the present invention. Switch 40 is shown in its quiescent, unflexed state. FIG. 3-B corresponds to the section AA' illustrated in FIG. 3-A. Referring to FIG. 3-B, switch 40 is formed on a base comprising a substrate 62 and an insulating layer 64 extending over substrate 62. A conductive, planar lower electrode 50 is disposed over insulating layer 64. A flexible membrane structure 52 is disposed over lower electrode 50 and is separated from lower electrode 50 by a chamber or gap 54. Preferably, gap 54 is filled with air and is capable of pressure equalization with the outside atmosphere. The edges of membrane structure 52 are anchored to the stationary part of switch 40 and remain fixed, while the center of membrane structure 52 is capable of downward deflection in response to the application of downward pressure by a fingerprint ridge.

Membrane structure 52 includes a conductive, creased upper electrode 66 disposed facing lower electrode 50, and a diaphragm or button 68 stacked above upper electrode 66. Diaphragm 68 forms the top, external boundary of switch 40. The fingerprint or texture of interest is pressed directly on diaphragm 68. Diaphragm 68 provides added thickness, mechanical stability, and impact resistance to membrane structure 52. Preferably, the height of the top surface of diaphragm 68 is within less than +4 μm, in particular within –0.5 μm or less, of the height of the rigid area surrounding diaphragm 68. Excessively increasing the height of membrane structure 52 can make switch 40 vulnerable to external shocks. Excessively lowering the height of membrane structure 52 relative to its fixed surroundings can impede the protrusion of texture ridges to positions needed for establishing effective contact with the upper surface of membrane structure 52. The height of the top surface of diaphragm 68 can exceed the height of the surrounding rigid area by a few microns if improved sensitivity is desired. Preferably, the height of the top surface of diaphragm 68 is not below the height of the surrounding rigid area by more than 0.25 to 0.5 μm, if at all.

Upper electrode 66 is disposed along the bottom of membrane structure 52. Upper electrode 66 includes a planar contact surface facing lower electrode 50, such that downward flexing of membrane structure 52 establishes electrical contact between the contact surfaces of upper and lower electrodes 50, 66. For clarity, upper electrode 66 and lower electrode 50 are hatched in FIG. 3-B.

Lower electrode 50 is electrically connected to row lead 44 through a passive resistor 70 disposed over insulating layer 64. In general, lower electrode 50 may also form part of row lead 44. Upper electrode 66 is electrically connected to column lead 46 (shown in FIG. 3-A) through a conductor which forms part of the cover of tunnel 48 extending between chamber 54 and column lead 46, as will be further illustrated below.

Row and column leads 44, 46 are made of a highly conductive material that can be easily patterned using known photolithography and etching techniques. Leads 44, 46 are electrically isolated from each other and from all other structures by films of insulating material. Lower and upper electrodes 50, 66 are preferably made of a material that is resistant to corrosion and oxidation, has a relatively high conductivity or forms an oxide having high conductivity, and is amenable to patterning by existing processes. Gold, copper, chromium, molybdenum, ruthenium, and indium tin oxide (ITO) are examples of preferred materials for lower and upper electrodes 50, 66.

Diaphragm 68 is made of a material which is resistant to corrosion and oxidation, which can be made to adhere well to upper electrode 66, and which has a desired stiffness. Diaphragm 68 is preferably made of a plastic or polymer. In a present implementation, diaphragm 68 is made of Shin-Etsu SINR 3180, a silicone-based polymer having a Young's modulus of about 40 MPa. Other suitable materials for diaphragm 68 include aluminum oxide, silicon dioxide, silicon nitride, metallic films, and polymer films such as elastomers, polyacrylates, etc. The choice of materials for diaphragm 68 and/or upper electrode 66 affects the flexibility and reliability of membrane structure 52. The materials and dimensions of diaphragm 68 and upper electrode 66 are preferably chosen such that the performance of membrane structure 52 does not degrade due to repeated deflections over the lifetimes of switch 40. Moreover, the materials and dimensions of membrane structure are chosen such that membrane structure fully deflects under typical pressures applied by fingerprints, but does not substantially deflect in the absence of applied fingerprint pressures.

Typically, the load applied by an individual's finger on a sensor is in the range of 100-500 grams. The fingerprint is approximately 15 mm×15 mm in general diameter. Thus, an array of switches with total dimensions of 15 mm×15 mm is generally appropriate for sensing fingerprints. The spacing between typical fingerprint ridges is on the order of 400 µm. If the switches are assumed to be placed 50 µm apart on a two dimensional x-y grid, an array of on the order of 300×300 switches would be suitable for covering a sensor surface area of 15 mm×15 mm. There are a total of 90,000 sensors in such an array, and the applied load from the fingertip can be assumed to be distributed over these 90,000 sensors. As a first order approximation, one can assume that the area of the ridges is equal to that of the valleys. Thus, approximately 45,000 sensors bear the applied load. If one conservatively assumes an applied load of 90 grams from the fingerprint, then each cell bears an approximate load of about 2 mg.

Membrane structure 52 is preferably designed such that it deflects adequately under the application of 2 mg of load to establish contact between upper electrode 66 and lower electrode 50, and then reverts to its original, quiescent position when the load is removed. The geometry and material properties of membrane structure 52 can be empirically tailored so membrane structure 52 causes closure of its corresponding switch if membrane structure 52 is positioned under a ridge or protrusion of the texture of interest, and does not cause such closure if membrane structure 52 is positioned under a valley or depression of the texture of interest.

An order-of-magnitude estimate of the dependence of the central deflection of a circular membrane on the properties of the membrane can be calculated by considering an ideal, flat disk-shaped monolithic membrane anchored around its circular edge. The central deflection of such a membrane is on the order of $$y = \frac{Pha^4}{EA_p h^4} \quad [2]$$

where P is applied pressure,
h is the membrane thickness,
a is the membrane radius,
E is Young's Modulus for the membrane material,
and $A_p$ is a dimensionless stiffness coefficient.

Equation [2] applies to both flat and corrugated diaphragms. For a flat diaphragm and a Poisson ratio µ=0.30, the value of $A_p$ is 5.86. The value of $A_p$ is higher for corrugated membranes.

Consider some approximate values for the variables in Eq. [2]:
$P=3\times10^4$ Pa;
$E=3\times10^{11}$ Pa;
$a=1.6\times10^{-5}$ m (16 µm);
$h=1.5\times10^{-7}$ m (0.15 µm);
$A_p=6$.

The value of P above corresponds approximately to 5 psi, or a load of about 2 mg applied over a circle having a radius of about 16 µm. The value of E above is on the order of the Young's moduli of metals such as Cr ($2.8\times10^{11}$ Pa) and Mo ($3.24\times10^{11}$ Pa). The values above yield a central deflection of about $3\times10^{-7}$ m, or about 0.3 µm. Actual deflection values will depend on the particular materials, dimensions, and geometries (e.g. corrugation) employed in a given switch. Furthermore, the deflection of membranes comprising multiple stacked layers will depend on the properties of those layers. Eq. [2] nevertheless provides a useful indication of the effect of several variables on the deflection of the upper membrane in response to applied force.

If the quiescent state separation of the upper and lower electrode is made to be slightly smaller than the typical deflection of the membrane in response to an applied fingerprint ridge, the upper electrode makes contact with the lower electrode under applied pressure, allowing detection of the fingerprint ridge. The separation between the upper electrode and the lower electrode is preferably larger than any height or thickness variability that might arise in the membrane due to processing induced stresses, such that such stresses do not result in closure of the switch in the absence of applied pressure.

The fabrication of switches 40 will be described with reference to FIGS. 4-A through 8-B. The description below will focus on a single switch 40. As is apparent to the skilled artisan, structures corresponding to multiple switches 40 are formed in each step described below. The various deposition/patterning steps can be performed using known processes such as dry etching, wet chemical etching, and deposition using photolithographic liftoff stencils.

FIGS. 4-A, 4-B, and 4-C show isometric, top, and side sectional views, respectively, of the structure resulting after lower electrode 50 is formed along the base of a switch 40, according to the preferred embodiment of the present invention. The view of FIG. 4-C is taken along the line AA' shown in FIG. 3-A. The fabrication process starts with the base formed by substrate 62 and insulating layer 64. Preferred materials for substrate 62 include silicon, aluminum oxide, and glass. Preferred materials for insulating layer 64 include silicon dioxide, silicon oxinitride, and aluminum oxide. Alternative materials for substrate 62 include insulators such as plastics. Insulating layer 64 can be formed on substrate 62 by sputtering or other known methods. In a present implementation, substrate 62 is made of silicon or glass while insulating layer 64 is made of silicon dioxide.

Referring back to FIGS. 4-A, 4-B, and 4-C, a passive resistor strip 70 is deposited onto insulating layer 64 and patterned using dry etching, wet etching, or using a photolithographic liftoff stencil during deposition. Alternatively, resistor strip 70 can be electroplated in the required pattern. Resistor strip 70 is preferably made of a high-resistivity material such as tantalum oxide, titanium dioxide, doped silicon, or another oxidized metal or doped semiconductor. The thickness of resistor strip 70 is preferably between 200 Å and 5000 Å. The thickness, length, width, and composition of resistor strip 70 are chosen so as to yield a desired resistance value. In a present implementation, resistor strip 70 consists of a 2500 Å-thick layer of tantalum oxide, having a resistance of approximately 100,000Ω.

A straight conductive row lead 44 is formed on insulating layer 64. Row lead 44 is preferably made of highly-conductive material(s) such as Cu, Cr, Au, Mo, and ITO. The thickness of row lead 44 is preferably between 1000 and 5000 Å, in particular between 2000 and 4000 Å. In a present implementation, row lead 44 is formed by a 300 Å Cr/2500 Å cu/1000 ÅCr stack.

Lower electrode 50 is deposited onto insulating layer 64, for example using a photolithographic liftoff stencil. Lower electrode 50 has a substantially planar upper contact surface for establishing electrical contact with the upper electrode of the switch. The top surface of lower electrode 50 is preferably formed of metal(s) or alloy(s) that are resistant to corrosion, abrasion, frictional forces, and etchant materials used in subsequent processing steps, as described below. Preferred materials for lower electrode 50 include Cr, Au, Ru, Mo, and ITO. The thickness of lower electrode 50 is preferably between 500 and 5000 Å, in particular between 1000 and 2000 Å. In a present implementation, lower electrode 50 is formed by a 1000 Å Cr/500 Å Au/300 Å Ru stack.

FIGS. 5-A, 5-B, and 5-C show isometric, top, and side sectional views, respectively, of the structure resulting after several additional fabrication steps performed according to the preferred embodiment of the present invention. An insulator layer 80 is deposited along the entire surface of the structure shown in FIGS. 4-A, 4-B, and 4-C, except for the middle part of lower electrode 50. The uncovered middle part of lower electrode 50 is to form the contact surface of the switch. Insulator layer 80 serves to insulate row lead 44, resistor 70, and lower electrode 50 from conductive structures which are to be subsequently deposited. Insulator layer 80 extends over the edge of lower electrode 50, and forms an annular protrusion 81 around the edge of lower electrode 50. Annular protrusion 81 serves to generate an annular crease in subsequently deposited layers, including the upper electrode of switch 40. Preferred materials for insulator layer 80 include alumina, silicon oxide, and silicon oxynitride. In alternative implementations, insulator layer 80 can be formed by a plastic or polyimide. The thickness of insulator layer 80 is preferably between 500 Å to 1 µm. In a present implementation, insulator layer 80 is formed by a 5000 Å-thick alumina layer.

A straight column lead 46 is deposited over insulator layer 80, away from lower insulator 50 and along a direction perpendicular to the direction of row lead 44. Suitable materials and thicknesses for column lead 46 are generally similar to those described above for row lead 44. In a present implementation, column lead 46 is formed by a 100 Å Cr/4000 Å Au/300 Å Cr stack.

A first sacrificial layer 82 is formed over the contact surface of lower electrode 50, and over part of insulator layer 80 and column lead 46. Sacrificial layer 82 includes a generally circular central part 86 extending over the entire extent of the contact surface of lower electrode 50 and over a part of insulator layer 80 surrounding the contact surface. Central part 86 of sacrificial layer 82 will form part of the air chamber of switch 40, between lower electrode 50 and the upper electrode. Sacrificial layer 82 also includes a tunnel part 90a-b, which extends away from central part 86 in a direction parallel to row lead 44. Tunnel part 90a-b will form an inter-cell air tunnel for facilitating the equalization of pressure between different switch chambers. Sacrificial layer 82 further includes a set of four vent extensions 88 extending away from central part 86, at 45° relative to row lead 44 and column lead 46. Vent extensions 88 serve as a channel area that provides access to sacrificial layer 82 during a subsequent step in which sacrificial layer 82 is removed. In general, one or more (e.g. more than four) vent extensions may be used.

The thickness of sacrificial layer 82 defines the spacing between the contact surfaces of lower electrode 50 and the upper electrode to be subsequently deposited over sacrificial layer 82. The thickness of sacrificial layer 82 is preferably between 500 Å and 1 µm, in particular between 0.1 and 0.5 µm. Suitable materials for sacrificial layer 82 include Cu, Al, or any other etchable materials. In a present implementation, sacrificial layer 82 is formed by 2000 Å-thick Cu. In alternative embodiments, the sacrificial layer may include an organic release material such as a polyimide.

A second, annular sacrificial layer 84 is deposited onto first sacrificial layer 82, along an annular portion flanking the contact surface of lower electrode 50 and extending generally over the annular protrusion 81. Sacrificial layer 84 serves to provide additional annular creasing to the upper electrode to be subsequently deposited, in order to reduce residual stresses in the upper electrode. Suitable thicknesses and materials for second sacrificial layer 84 are similar to those described above for first sacrificial layer 82. In a present implementation, second sacrificial layer 84 is formed by 3000 Å-thick Cu.

FIGS. 6-A, 6-B, and 6-C show isometric, top, and side sectional views, respectively, of the structure resulting after an upper electrode 66 is formed above sacrificial layers 82, 84, according to the preferred embodiment of the present invention. Upper electrode 66 is deposited over the entire extents of sacrificial layers 82, 84, as well as over insulator layer 80 and column lead 46. As is clear to the skilled artisan, upper electrode 66 extends over only parts of insulator layer 80 and column lead 46. Upper electrode 66 includes a central part 92 extending above lower electrode 50 and sacrificial layers 82, 84, an edge anchor part 94 extending over insulator layer 80 but not over sacrificial layers 82, 84, and a tunnel and column contact part 96 extending over column lead 46. Upper electrode 66 does not extend over the tips of the vent extensions 88 defined by sacrificial layer 82, in order to provide access to sacrificial layers 82, 84 through the vent extensions 88, which serve as a channel area during subsequent steps in which sacrificial layers 82, 84 are removed.

Edge anchor part 92 anchors the edges of upper electrode 66 to the fixed insulator layer 80. Central part 92 is designed to be capable of downward flexing motion after the removal of sacrificial layers 82, 84. Central part 92 includes annular creases for decreasing stresses within upper electrode 66. Central part 92 further includes a planar inner contact surface facing the contact surface of lower electrode 50. Tunnel and column contact part 96 defines the electrical contact between column lead 46 and upper electrode 66, as well as the top part of the intercell tunnel extending over column lead 46.

Preferred materials for upper electrode 66 include Au, Cr, Mo, Ru, and ITO. The thickness of upper electrode 66 is chosen so as to produce desired stiffness and stress characteristics. Preferably, the thickness of upper electrode 66 is between 800 and 4000 Å, in particular between 1000 and 2000 Å. In a present implementation, upper electrode 66 is formed by a 500 Å Au/1000 Å Cr stack, with the gold layer stacked below the chromium layer. The free part of upper electrode 66 preferably has an overall size or diameter between 1 and 5 µm. In a present implementation, the diameter of the free part of upper electrode 66 is about 3.2 µm.

FIGS. 7-A and 7-B illustrate, in top and side sectional views, respectively, the formation of a field oxide insulator and impact-absorbing support 100 over the structure of FIGS. 6-A through 6-C, according to the preferred embodiment of the present invention. Support 100 is deposited over the entire extent of the underlying structure, except over the center of upper electrode 66 and over the tips of vent extensions 88. Support 100 can extend over the anchor part 94 of upper electrode 66. Support 100 does not extend over the central part of upper electrode 66, in order to allow the flexure of upper electrode 66. Support 100 does not extend over the tips of vent extensions 88, in order to provide vents for removing the sacrificial layers from switch 40. Support 100 serves to electrically insulate column lead 46 and upper electrode 66 from the external environment. Support 100 also provides a robust external surface for switch 40 outside the area defined by the flexible membrane structure that drives the motion of upper electrode 66. The robust external surface provided by support 100 is capable of absorbing external shocks and hits to the switches 40, minimizing the damage to the flexible membrane structures of switches 40. Such hits can occur during normal operation of a fingerprint sensor, for example if a user bumps or drops an object onto the surface of the sensor.

Preferred materials for support and insulator layer 100 include silicon dioxide, silicon nitride, and silicon oxynitride. The thickness of layer 100 is preferably between 1000 Å and 3 μm. In a present implementation, layer 100 is formed by 0.75 μm-thick field silicon dioxide.

After layer 100 is formed, a wet chemical etch is used to remove the sacrificial layers present between lower electrode 50 and upper electrode 66. The sacrificial layers are removed through the vents defined over the tips of vent extensions 88. Following the removal of the sacrificial layers, lower and upper electrodes 50, 66 are separated by the air gap or chamber 54.

FIGS. 8-A and 8-B illustrate, in top and side sectional views, respectively, the formation of a flexible top diaphragm 68 and vent seals 102 on the structure of FIGS. 7-A, 7-B, according to the preferred embodiment of the present invention. Diaphragm 68 is formed over upper electrode 66 and over the inner edge of layer 100. Together with upper electrode 66, diaphragm 68 forms a flexible membrane structure 52 capable of flexing to establish contact between upper electrode 66 and lower electrode 50. Diaphragm 68 adds thickness and stiffness to membrane structure 52. Anchoring the external edge of diaphragm 68 to layer 100 reduces the stresses caused within upper electrode 66 by diaphragm 68.

Preferably, the height of membrane structure 52 is approximately equal to the height of the support layer 100. It is preferred that the top surface of membrane structure 52 be within less than 4 μm higher and 0.5 μm lower than the top surface of support layer 100. If the top surface of membrane structure 52 is too low relative to support layer 100, support layer 100 can obstruct the penetration of fingerprint ridges to membrane structure 52 and thus prevent the closing of switch 40. If the top surface of membrane structure 52 is too high relative to support layer 100, switch 40 can become unnecessarily vulnerable to external impact forces capable of stressing or damaging membrane structure 52 or lower electrode 50.

A set of four vent seals 102 are deposited over the sacrificial layer vents defined in support layer 100, for closing the internal chamber of switch 40 to outside particles that could otherwise contaminate switch 40. Vent seals 102 preferably are not air-tight, such that the air pressure within the internal chamber of switch 40 can equalize with the air pressure in the external environment of switch 40. Preferred materials for vent seals 102 include silicon oxide, silicon nitride, metals, or other materials that will not leak into the internal chamber of switch 40. The thickness of vent seals 102 is preferably sufficiently high so that vent seals 102 cover the aperture left behind by the vent extensions of the sacrificial layers, but not so high that vent seals 102 interfere with the sensing of fingerprints by blocking access to the membrane structure 52. In a present implementation, vent seals 102 include a lower layer of 0.6 μm-thick silicon dioxide, and a polymer cap stacked over the silicon dioxide lower layer. In this implementation, it was observed that the air pressure within the internal switch chamber substantially equalizes with the atmospheric air pressure outside of the switch within a time period on the order of half an hour or less. In alternative implementations, suitable vent seals may be formed by a single layer of a material such as silicon nitride or a metal.

FIG. 9-A shows a side sectional view of a membrane switch 240 according to an alternative embodiment of the present invention. Switch 240 is shown in its quiescent, open state. Switch 240 is part of a larger two-dimensional array, and is connected to row and column leads (not shown) as described above. Switch 240 includes a membrane structure (membrane) 252 comprising an upper electrode 266. Upper electrode 266 is attached to the underside of a flexible, insulative, protective flat membrane 268. Membrane 268 is anchored around its edges to the fixed structure of switch 240. Upper electrode 266 is capable of establishing contact with a fixed lower electrode 250 when membrane 268 flexes downward in response to pressure applied by a texture protrusion or ridge. Switch 240 differs from the switch 40 described above in that the upper electrode of switch 240 is not anchored around its edges to the fixed structure of the switch. The stiffness properties of membrane 252 are determined primarily by the properties of the protective, insulative part 268, rather than by the properties of upper electrode 266.

FIG. 9-B shows a side sectional view of a membrane switch 340 according to another alternative embodiment of the present invention. Switch 340 is shown in its quiescent, open state. Switch 340 is part of a larger two-dimensional array, and is connected to row and column leads (not shown) as described above. Switch 340 includes a membrane structure (membrane) 352 including an upper electrode membrane 366 anchored around its edges to the fixed structure of the switch, and an insulative, protective, coupling button 368 disposed above upper electrode 366. Button 368 extends above the fixed surfaces of switch 340, so as to couple the downward pressure applied by texture ridges to upper electrode 366. The downward pressure results in contact between the movable upper electrode 366 and a fixed lower electrode 350. Switch 340 differs from the switch 40 described above in that the button 368 is not anchored around its edges to the fixed part of switch 340.

FIG. 9-C shows a side sectional view of a membrane switch 440 according to yet another alternative embodiment of the present invention. Switch 440 is shown in its quiescent, closed state. Switch 440 is part of a larger two-dimensional array, and is connected to row and column leads (not shown) as described above. Switch 440 includes a fixed, annular upper electrode 466 facing downward into a first generally annular cavity 454a. Upper electrode 466 is rigidly coupled to a base 462 of switch 440, and does not move substantially during the operation of switch 440. Upper electrode 466 is disposed on the bottom side of a cantilevered, annular support 480 which is rigidly coupled to base 462. Upper electrode 466 extends around a vertical aperture 496 defined in the center of support 480.

A flexible membrane structure 452 comprises a flexible lower electrode membrane 450 anchored around its edges to base 462. The middle part of membrane 450 extends upward from base 462, and is separated from base 462 by a disk-shaped second cavity 454b. A coupling button 468 is disposed above the middle part of lower electrode 450, through vertical aperture 496. Coupling button 468 extends above the fixed surfaces of switch 440, so as to couple applied downward pressure to lower electrode membrane 450. A thin, flexible sheet 498 is disposed over the entire switch array, above the corresponding coupling buttons of all the switches in the array. Flexible sheet 498 serves to keep particulate matter away from the contact surface between the fixed upper electrode 466 and the movable lower electrode 450.

Switch 440 is closed in its quiescent state, when no pressure or texture is applied. In the quiescent state, upper electrode 466 is in electrical contact with lower electrode 450. When a texture ridge or protrusion applies downward pressure to lower electrode 450 through sheet 498 and coupling button 468, lower electrode 450 flexes downward and breaks its electrical contact to upper electrode 466. Switch 440 is then open. When the applied pressure is removed, lower electrode 450 returns to its quiescent state and switch 440 becomes closed again.

The structure described with reference to FIG. 9-C may be modified in a manner similar to the one described above with reference to FIG. 9-A. An insulative lower membrane may be used instead of a conductive one, and a conductive lower electrode is disposed onto the top surface of the insulative membrane.

The use of the suspended-membrane switch designs described above allows enhanced reliability and relative insensitivity to the amount of pressure applied by the individual. The flexible membrane is capable of closing each switch in response to relatively light pressure applied by a user. Since the lower and upper electrodes are spaced closely apart relative to their in-plane extents, excessive application of force to the upper electrode does not generally cause fracture of the membrane. The switch and associated passive resistor design minimizes the need to use transistors to address the different cells using expensive CMOS processes. The switch is relatively insensitive to electrostatic discharge or other voltage spikes that would otherwise damage silicon-based sensors.

The power consumption of the sensor device is relatively low, since a relatively small amount of current is used to test for the state of each electrical circuit when a finger or texture is placed on the sensor. Additionally, the sensor is on only when a fingerprint is being acquired, which reduces the drain on the energy source used for polling the sensor. In its quiescent state, the sensor draws no current. Low power consumption is particularly useful in portable devices such as cellular phones and laptop computers.

The sensor is relatively insensitive to the choice of materials, and thus can be made relatively robust through the use of materials having relatively high corrosion and abrasion resistance. The device can be made relatively inexpensively, since its fabrication does not require expensive processing of silicon wafers. The relative ease of processing allows for the fabrication process to be applied to large area substrates, yielding more sensors per processed wafer and decreased manufacturing costs.

The use of a membrane allows eliminating the lateral motion of the upper electrode relative to the lower electrode. The membrane design facilitates the sealing of the chamber containing the contact surface of the switch, thus preventing external particles from contaminating the contact surface and blocking the switch in an open or closed state. Such particles could in principle contaminate the contact surface during normal operation of the sensor, or during manufacturing steps used to fabricate the sensor. The chamber sealing can be appropriately tailored to allow the passage of air in and out of the chamber while preventing the entry of contaminants. It is thought that the preferred manufacturing process and structure described above allows keeping out contaminants that are larger than on the order of hundreds or thousands of Angstroms. Allowing the pressure inside the switch chambers to become equal to the pressure outside the switches reduces the dependence of the switch operation on environmental pressure.

The individual membrane sealing reduces the need for a global cover sheet applied over all the switches for mechanical protection. A thick or inflexible cover sheet can lead to cross-talk between adjacent switches, as switches disposed under valleys are pressed downward by the downward motion of the cover sheet pressed down by adjacent ridges. Providing inter-switch tunnels allows the pressure within different switch chambers to equalize. Equalizing the pressures in different switch chambers leads to reduced variability in the force required to close different switches. A flexible, global cover sheet applied over all the switches can be used in a sensor according to alternative embodiments of the present invention.

The profile and relatively compact size of the flexible membrane structure allows the use of thick, hard field regions between adjacent membrane structures. The field regions protect the membrane structures from high impact forces and lateral shear forces caused by scratching, aggressive wiping, rubbing or other forces.

A global sealed vent may be used at the end of each row or column of switches, in order to facilitate the equalization of pressure between the interior chambers of multiple sensor switches and the external environment. Such a global vent may include an aperture, facing upward, that communicates with one or more interswitch tunnel(s) of the sensor. The aperture can be sealed by a structure such as a polymer film, so as to prevent the entry of particulate contaminants into the interswitch tunnels.

In alternative embodiments, a substrate made of a insulator such as a plastic may be employed to support the switch array. Various conductors can be deposited on the insulator, and insulative sheets may be laminated onto the substrate to provide desired insulation between the conductors.

In an alternative embodiment, the quiescent state of each state is closed rather than open. A flexible membrane can then include a movable lower electrode of the switch disposed on the upper surface of a membrane. The membrane is separated from the base by a cavity allowing downward flexure of the membrane into the cavity. A fixed upper electrode of the switch is disposed along a protrusion which forms part of the base or is rigidly attached to the base. The upper electrode faces downward. In the closed quiescent state, the fixed and movable electrodes are in contact along an annular region around the cavity. When the membrane is pressed down by an applied ridge, the flexure of the membrane causes the lower electrode to move downward so as to break the contact between the fixed and movable electrodes.

It will be clear to one skilled in the art that the above embodiments may be altered in many ways without departing from the scope of the invention. For example, the edges of the upper electrode need not be anchored to the fixed switch structure. An unanchored upper electrode can be stacked underneath another membrane layer which is anchored around the edges to the fixed switch structure. Devices as described above can be used in robotic control applications, on the tips of robotic arms, for sensing textures of objects rather than skin. A button disposed on each flexible membrane structure can extend above the other structures of the sensor, in order to facilitate the coupling of texture ridges to the flexible membranes. The switch chambers can be sealed to be air- or vacuum-tight, in order to maintain a vacuum or given amount of air within the chambers. Inter-chamber tunnels can be provided along both orthogonal directions (row and column) of the sensor, as well as along other directions. The vents used for removing the sacrificial layers can be positioned in various places, such as above an inter-chamber tunnel. Various materials, layer thicknesses and other structural dimensions are given for illustrative purposes. It is understood that other dimensions and materials can be suitable for use with the present invention. Accordingly, the scope of the invention should be determined by the following claims and their legal equivalents.

What is claimed is:

1. A method of making an integrated texture sensor for sensing a texture that is protected from external contaminating particulates and will self-equalize using air from outside the sensor, comprising:
   a) forming a plurality of conductive row lines and a plurality of conductive column lines on a substrate, each of the row lines being insulated from each other and each of the column lines being insulated from each other, the row lines and column lines intersecting to form a switch area between adjacent row lines and adjacent column lines;
   b) forming a lower electrode in each of a plurality of switch areas;
   c) forming a sacrificial area directly over each lower electrode and a non-sacrificial area around each sacrificial area;
   d) forming an individual membrane above each sacrificial area, the individual membrane being anchored to the non-sacrificial area, the individual membrane comprising an upper electrode disposed directly above the sacrificial area, wherein the individual membrane does not cover a channel area adjacent to the sacrificial area and is separate from individual membranes formed above other sacrificial areas;
   e) removing each sacrificial area by introducing a sacrificial etchant through the channel area, thereby forming a cavity region at each sacrificial area; and
   f) sealing the channel area adjacent to each sacrificial area by forming a vent seal having a thickness selected to close each cavity region from the external contaminating particulates while permitting self-equalization of air pressure within the each cavity region with air that is external to the sensor.

2. The method according to claim 1 wherein the individual membrane is a flexible membrane.

3. The method according to claim 2 wherein the step of forming the individual membrane further includes forming an insulative diaphragm stacked over the upper electrode.

4. The method according to claim 3 wherein the step of forming the sacrificial area also includes interswitch tunnel sacrificial areas, and the step of removing the sacrificial area removes the interswitch tunnel sacrificial areas to form a plurality of interconnected tunnels between cavity regions, wherein the interconnected tunnels equalize pressure between cavity regions.

5. The method according to claim 2 wherein the step of forming the individual membrane further includes forming the upper electrode in an annular shape and having an annular crease.

6. The method according to claim 5 wherein the step of forming the sacrificial area also includes forming interswitch tunnel sacrificial areas, and the step of removing the sacrificial area removes the interswitch tunnel sacrificial areas to form a plurality of interconnected tunnels between cavity regions, wherein the interconnected tunnels equalize pressure between cavity regions.

7. A method of making a skin-texture sensor for sensing a skin texture having a plurality of ridges and a plurality of valleys, comprising:
   a) establishing a base;
   b) disposing a plurality of conductive row lines on the base;
   c) disposing a plurality of conductive column lines on the base, the column lines being insulated from the row lines; and
   d) forming an array of membrane switches on the base such that a spacing between adjacent switches in the array is less than one half of a spacing between adjacent ridges, each membrane switch corresponding to a pair of one of the row lines and one of the column lines, wherein forming each membrane switch of the array comprises:
   disposing a lower electrode on the base,
   electrically connecting the lower electrode to said one of the row lines,
   disposing a flexible upper membrane structure over the lower electrode, comprising an upper electrode disposed facing the lower electrode separated from the lower electrode by a cavity and connected to said one of the column lines, the flexible upper membrane structure being separate from the flexible upper membrane structures of the other membrane switches in the array,
   wherein applying a ridge of the texture to said each membrane switch causes a flexure of the membrane resulting in a contact between the lower electrode and the upper electrode, the contact establishing an electrical communication between said one of the row lines and said one of the column lines, and wherein
   disposing a valley of the texture over said each membrane switch does not result in the contact between the lower electrode and the upper electrode.

8. The method according to claim 7 wherein the step of disposing the flexible upper membrane structure over the lower electrode includes forming the upper electrode as a conductive membrane.

9. The method according to claim 8 wherein the step of disposing. the flexible upper membrane structure over the lower electrode includes forming an insulative diaphragm stacked over the conductive membrane.

10. The method according to claim 9 wherein the step of disposing the flexible upper membrane structure over the lower electrode includes forming the conductive membrane in an annular shape and having an annular crease.

11. The method according to claim 7 wherein the step of disposing the flexible upper membrane structure over the lower electrode includes forming an insulative diaphragm stacked over the upper electrode.

12. The method according to claim 1, further comprising the step of connecting a passive resistor in series between each membrane switch and one of the row lines and the column lines corresponding to the switch area for the each membrane switch.

13. The method according to claim 12, further comprising the step of connecting a pull-down passive resistor between one of each of the row lines and each of the column lines and a lower electric potential for improving a discrimination of the sensor between an open state and a closed state of the each membrane switch.

14. The method according to claim 1, further comprising the step of connecting an active device in series between each membrane switch and one of the row lines and the column lines corresponding to the switch area for the each membrane switch.

15. The method according to claim 14, further comprising the step of connecting a pull-down passive resistor between one of each of the row lines and each of the column lines and a lower electric potential for improving a discrimination of the sensor between an open state and a closed state of the each membrane switch.

16. The method according to claim 7, wherein the step of establishing the base comprises using a semiconductor substrate.

17. The method according to claim 16, wherein the step of establishing the base further comprises using an insulator layer disposed over the semiconductor substrate.

18. The method according to claim 7, wherein the step of establishing the base comprises using an insulating substrate.

19. The method according to claim 7, wherein the step of establishing the base comprises using a glass substrate.

20. The method according to claim 7, further comprising the step of sealing the cavity using a multilayer seal that excludes contaminants on the order of thousands of Ångstroms or larger and permits self-equalization of air pressure within the each cavity region with air that is external to the sensor.

21. The method according to claim 20 wherein the seal permits the substantial self-equalization of air pressure to occur within less than thirty minutes.

22. The method according to claim 20 wherein the seal excludes contaminants on the order of hundreds of Ångstroms or larger.

23. The method according to claim 7 and further comprising the step of applying a flexible global cover sheet over all switches in the array.

24. The method according to claim 1 wherein forming a vent seal includes providing a multilayered vent seal comprising a lower layer of silicon dioxide and a polymer cap stacked over the lower layer.

25. The method according to claim 24 and further comprising the step of applying a flexible global cover sheet over the plurality of switch areas.

* * * * *